(12) United States Patent
Hamada et al.

(10) Patent No.: US 9,124,859 B2
(45) Date of Patent: Sep. 1, 2015

(54) IMAGE PROCESSING APPARATUS AND IMAGE PROCESSING METHOD

(71) Applicant: CANON KABUSHIKI KAISHA, Tokyo (JP)

(72) Inventors: Naru Hamada, Tokyo (JP); Tomohiro Sekiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 13/961,817

(22) Filed: Aug. 7, 2013

(65) Prior Publication Data
US 2014/0056575 A1 Feb. 27, 2014

(30) Foreign Application Priority Data

Aug. 27, 2012 (JP) ................................ 2012-186703

(51) Int. Cl.
| | | |
|---|---|---|
| G11B 27/00 | (2006.01) | |
| H04N 5/93 | (2006.01) | |
| H04N 9/87 | (2006.01) | |
| H04N 5/91 | (2006.01) | |
| G11B 27/10 | (2006.01) | |
| G11B 27/30 | (2006.01) | |
| H04N 5/92 | (2006.01) | |
| H04N 9/82 | (2006.01) | |

(52) U.S. Cl.
CPC ............... *H04N 9/87* (2013.01); *G11B 27/105* (2013.01); *G11B 27/3027* (2013.01); *H04N 5/91* (2013.01); *H04N 9/8205* (2013.01)

(58) Field of Classification Search
USPC ......... 386/278, 280, 281, 282, 283, 284, 290, 386/326, 353
See application file for complete search history.

(56) References Cited

U.S. PATENT DOCUMENTS

| | | | |
|---|---|---|---|
| 6,088,304 A * | 7/2000 | Aramaki et al. | 369/30.09 |
| 6,654,542 B1 * | 11/2003 | Winter | 386/248 |
| 6,907,464 B1 * | 6/2005 | Park et al. | 709/231 |
| 7,796,865 B2 * | 9/2010 | Park | 386/241 |
| 2009/0232471 A1 * | 9/2009 | Komi et al. | 386/52 |

FOREIGN PATENT DOCUMENTS

| | | |
|---|---|---|
| JP | 11341434 A | 12/1999 |
| JP | 2006202428 A | 8/2006 |
| JP | 2010-183248 A | 8/2010 |

OTHER PUBLICATIONS

Japanese Office Action issued in corresponding application No. 2012-186703 on Jul. 10, 2014.

* cited by examiner

*Primary Examiner* — Daquan Zhao
(74) *Attorney, Agent, or Firm* — Carter, DeLuca, Farrell & Schmidt, LLP

(57) ABSTRACT

An image processing apparatus for processing moving image files each including moving image data and identification information relating to continuity of time between the moving image file and other moving image file is arranged to perform an editing process for deleting at least a portion of the moving image data included in the moving image file, and change the identification information of the moving image file in accordance with the editing process, wherein in accordance with the editing process being preformed, identification information of at least one of the plurality of moving image files is changed to a predetermined value for discriminating that there is no continuity between the moving image file to which the editing process is performed and a moving image file which has continuity of time with the moving image file to which the editing process is performed.

19 Claims, 16 Drawing Sheets

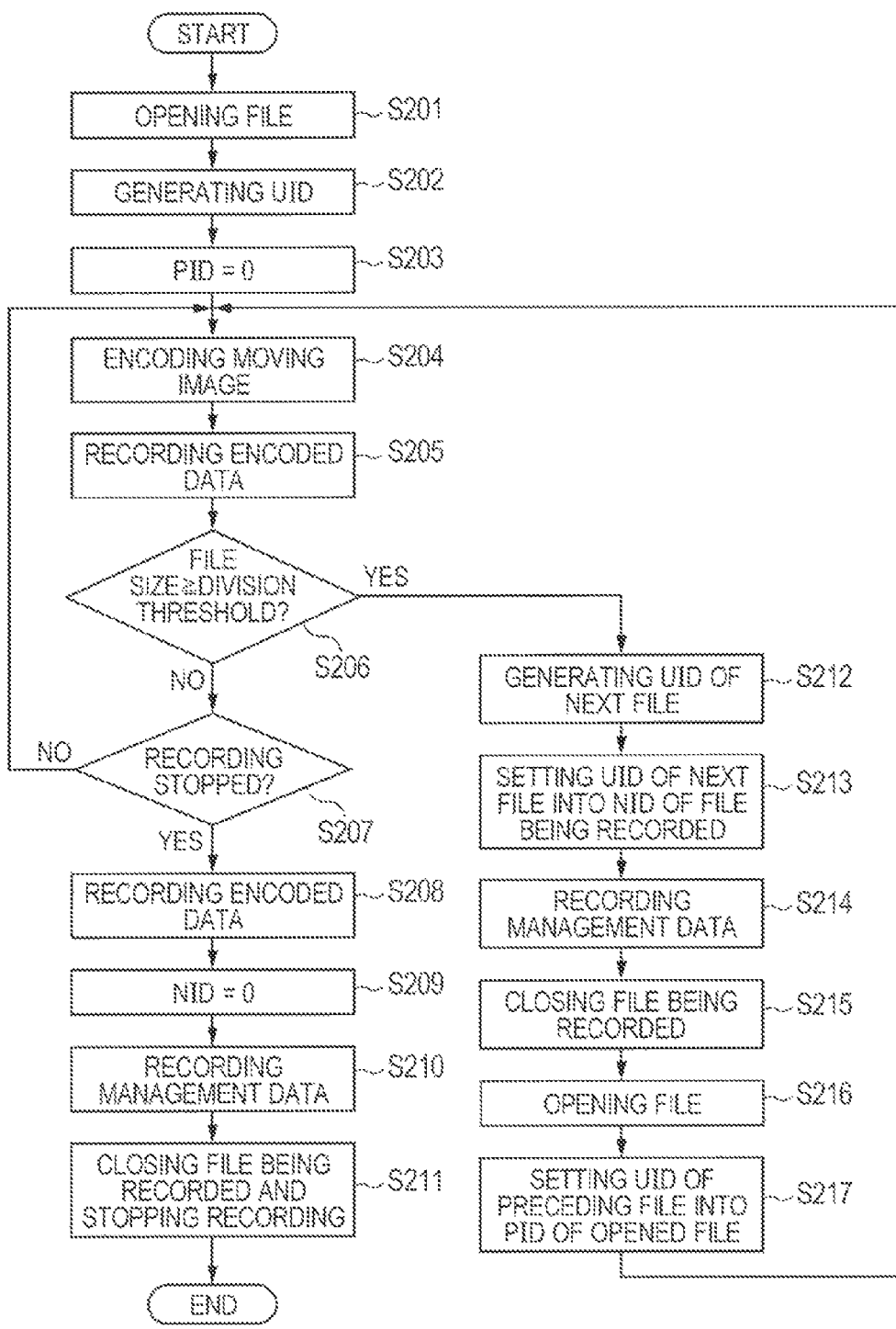

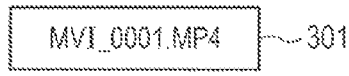
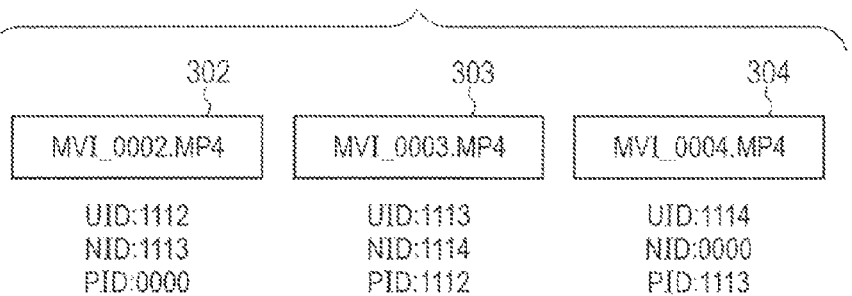
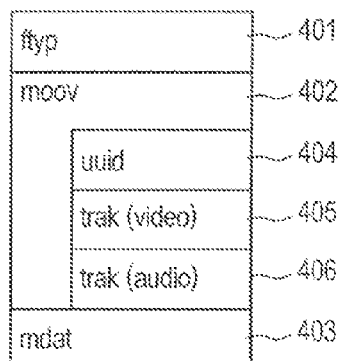
FIG. 5
| TYPE | LENGTH (BYTE) | CONTENT |
|---|---|---|
| Unique ID | 16 | VALUE PECULIAR TO FILE |
| Next ID | 16 | NEXT FILE UID 0: END FILE |
| Pre ID | 16 | PRECEDING FILE UID 0: HEAD FILE |

| FILE NAME | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 1114 | 1112 |
| MVI_0004.MP4 | 1114 | 1115 | 1113 |
| MVI_0005.MP4 | 1115 | 0000 | 1114 |
| MVI_0006.MP4 | 1116 | 0000 | 0000 |

902

| FILE NAME | UID | NID | PID |
|---|---|---|---|
| MVI_0001.MP4 | 1111 | 1112 | 0000 |
| MVI_0002.MP4 | 1112 | 0000 | 1111 |
| (DELETED) | (DELETED) | (DELETED) | (DELETED) |
| MVI_0004.MP4 | 1114 | 1115 | 0000 |
| MVI_0005.MP4 | 1115 | 0000 | 1114 |
| MVI_0006.MP4 | 1116 | 0000 | 0000 |

| FILE NAME | UID | NID | PID |
|---|---|---|---|
| MVI_0001.MP4 | 1111 | 1112 | 0000 |
| MVI_0002.MP4 | 1112 | 0000 | 1111 |
| MVI_0003.MP4 | 1113 | 1114 | 0000 |
| MVI_0004.MP4 | 1114 | 1115 | 1113 |
| MVI_0005.MP4 | 1115 | 0000 | 1114 |
| MVI_0006.MP4 | 1116 | 0000 | 0000 |

1002

| FILE NAME | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 0000 | 1112 |
| MVI_0004.MP4 | 1114 | 1115 | 0000 |
| MVI_0005.MP4 | 1115 | 0000 | 1114 |
| MVI_0006.MP4 | 1116 | 0000 | 0000 |

1003

| FILE NAME | UID | NID | PID |
|---|---|---|---|
| MVI_0001.MP4 | 1111 | 1112 | 0000 |
| MVI_0002.MP4 | 1112 | 0000 | 1111 |
| MVI_0003.MP4 | 1113 | 0000 | 0000 |
| MVI_0004.MP4 | 1114 | 1115 | 0000 |
| MVI_0005.MP4 | 1115 | 0000 | 1114 |
| MVI_0006.MP4 | 1116 | 0000 | 0000 |

| FILE NAME | UID | NID | PID |
|---|---|---|---|
| MVI_0001.MP4 | 1111 | 1112 | 0×FFFF |
| MVI_0002.MP4 | 1112 | 1113 | 0×FFFF |
| MVI_0003.MP4 | 1113 | 1114 | 0×FFFF |
| MVI_0004.MP4 | 1114 | 1115 | 0×FFFF |
| MVI_0005.MP4 | 1115 | 0000 | 0×FFFF |
| MVI_0006.MP4 | 1116 | 0000 | 0×FFFF |

1302

| FILE NAME | UID | NID | PID |
|---|---|---|---|
| MVI_0001.MP4 | 1111 | 1112 | 0×FFFF |
| MVI_0002.MP4 | 1112 | 0000 | 0×FFFF |
| (DELETED) | (DELETED) | (DELETED) | (DELETED) |
| MVI_0004.MP4 | 1114 | 1115 | 0×FFFF |
| MVI_0005.MP4 | 1115 | 0000 | 0×FFFF |
| MVI_0006.MP4 | 1116 | 0000 | 0×FFFF |

| FILE NAME | UID | NID | PID |
|---|---|---|---|
| MVI_0001.MP4 | 1111 | 1112 | 0×FFFF |
| MVI_0002.MP4 | 1112 | 0000 | 0×FFFF |
| MVI_0003.MP4 | 1113 | 1114 | 0×FFFF |
| MVI_0004.MP4 | 1114 | 1115 | 0×FFFF |
| MVI_0005.MP4 | 1115 | 0000 | 0×FFFF |
| MVI_0006.MP4 | 1116 | 0000 | 0×FFFF |

1402

| FILE NAME | UID | NID | PID |
|---|---|---|---|
| MVI_0001.MP4 | 1111 | 1112 | 0×FFFF |
| MVI_0002.MP4 | 1112 | 1113 | 0×FFFF |
| MVI_0003.MP4 | 1113 | 0000 | 0×FFFF |
| MVI_0004.MP4 | 1114 | 1115 | 0×FFFF |
| MVI_0005.MP4 | 1115 | 0000 | 0×FFFF |
| MVI_0006.MP4 | 1116 | 0000 | 0×FFFF |

1403

| FILE NAME | UID | NID | PID |
|---|---|---|---|
| MVI_0001.MP4 | 1111 | 1112 | 0×FFFF |
| MVI_0002.MP4 | 1112 | 0000 | 0×FFFF |
| MVI_0003.MP4 | 1113 | 0000 | 0×FFFF |
| MVI_0004.MP4 | 1114 | 1115 | 0×FFFF |
| MVI_0005.MP4 | 1115 | 0000 | 0×FFFF |
| MVI_0006.MP4 | 1116 | 0000 | 0×FFFF |

| FILE NAME | UID | NID | PID |
|---|---|---|---|
| MVI_0001.MP4 | 1111 | 1112 | 0000 |
| MVI_0002.MP4 | 1112 | 1113 | 1111 |
| (DELETED) | (DELETED) | (DELETED) | (DELETED) |
| MVI_0004.MP4 | 1114 | 1115 | 1113 |
| MVI_0005.MP4 | 1115 | 0000 | 1114 |
| MVI_0006.MP4 | 1116 | 0000 | 0000 |

1602

| FILE NAME | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 1114 | 0000 |
| MVI_0004.MP4 | 1114 | 1115 | 1113 |
| MVI_0005.MP4 | 1115 | 0000 | 1114 |
| MVI_0006.MP4 | 1116 | 0000 | 0000 |

1603

| FILE NAME | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 0000 | 1112 |
| MVI_0004.MP4 | 1114 | 1115 | 1113 |
| MVI_0005.MP4 | 1115 | 0000 | 1114 |
| MVI_0006.MP4 | 1116 | 0000 | 0000 |

1604

| FILE NAME | UID | NID | PID |
|---|---|---|---|
| MVI_0001.MP4 | 1111 | 1112 | 0000 |
| MVI_0002.MP4 | 1112 | 1113 | 1111 |
| MVI_0003.MP4 | 1113 | 0000 | 0000 |
| MVI_0004.MP4 | 1114 | 1115 | 1113 |
| MVI_0005.MP4 | 1115 | 0000 | 1114 |
| MVI_0006.MP4 | 1116 | 0000 | 0000 | they are associated with each other files and this is very inconvenient. Particularly, with respect to a partial file of the associated files, when an edition such as a partial deletion or the like is pergenerated by the editing function, since the association of the moving image data itself is lost, it becomes further difficult to recognize the files associated with each other.

IMAGE PROCESSING APPARATUS AND IMAGE PROCESSING METHOD

BACKGROUND OF THE INVENTION

1. Field of the Invention

The present invention relates to an image processing apparatus and, more particularly, to an edition of a moving image file.

2. Description of the Related Art

In the related art, a recording apparatus for recording a moving image signal and an audio signal into a recording medium has been known. In such a type of recording apparatus, recorded moving image and audio are managed as a file in accordance with a predetermined file system. As one recording arrangement, there has been proposed an arrangement which records a file in such a manner that the file is divided during recording of the moving image and audio so that a size of the file does not exceed an upper limit of the size prescribed by the file system (for example, refer to the Official Gazette of Japanese Patent Application Laid-Open No. 2010-183248).

An apparatus having an editing function for deleting a recorded moving image file or partially deleting a forward or backward portion than a designated position of the moving image file has also been known.

In the foregoing recording arrangement, for a period of time from a recording start instruction to a recording stop instruction by the user, each time the size of the file which is being recorded reaches the upper limit size, the file is divided and recorded. However, since each of the files which have been divided and recorded in the photographing of one time is managed as an independent file, the user cannot easily understand that they are the files associated with each other files and this is very inconvenient. Particularly, with respect to a partial file of the associated files, when an edition such as a partial deletion or the like is pergenerated by the editing function, since the association of the moving image data itself is lost, it becomes further difficult to recognize the files associated with each other.

SUMMARY OF THE INVENTION

In consideration of the above problems, it is an aspect of the invention to realize an editing method whereby in the case of generating and recording a plurality of files during the recording of one time, association information of the plurality of files is set and, even if the recorded files are edited, their relationship is held and updated.

To accomplish the above aspect of the invention, there is provided an image processing apparatus of the invention, for processing a plurality of moving image files each including moving image data and identification information relating to continuity of time between the moving image file and other moving image file, comprises: a processing unit configured to perform an editing process for deleting at least a portion of the moving image data included in the moving image file; and a control unit configured to change the identification information of the moving image file in accordance with the editing process, wherein in accordance with the processing unit performing the editing process for deleting at least a portion of the moving image data included in the moving image file, the control unit changes identification information of at least one of the plurality of moving image files to a predetermined value for discriminating that there is no continuity between the moving image file to which the editing process is pergenerated and a moving image file which has continuity of time with the moving image file to which the editing process is pergenerated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a recording process in the first embodiment;

FIGS. 3A and 3B are diagrams illustrating states of moving image files recorded in the first embodiment;

FIG. 4 is a diagram illustrating a construction of the moving image file;

FIG. 5 is a diagram illustrating a construction of identification information;

FIG. 9 is a diagram illustrating identification information of the moving image file;

FIG. 10 is a diagram illustrating identification information of the moving image file;

FIG. 13 is a diagram illustrating identification information of the moving image file;

FIG. 14 is a diagram illustrating identification information of the moving image file;

FIG. 16 is a diagram illustrating identification information of the moving image file;

DESCRIPTION OF THE PRESENT EMBODIMENTS

Various exemplary embodiments, features, and aspects of the present invention will be described in detail below with reference to the drawings.

First Embodiment

Construction of Apparatus

Figure 1:
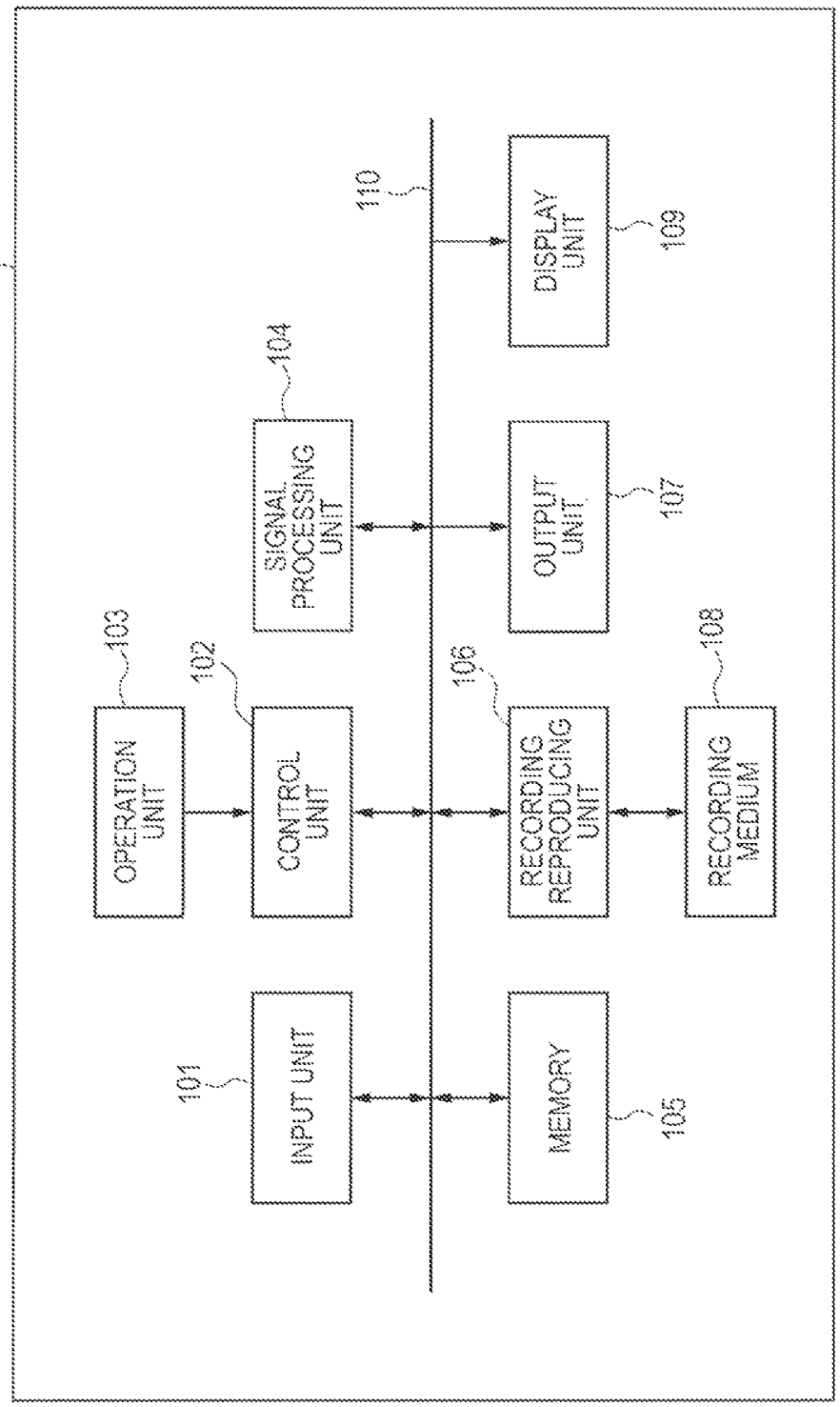
FIG. 1 is a block diagram illustrating an example of a construction of a recording apparatus according to an embodiment of the invention.

FIG. 1 is a block diagram illustrating an example of a construction of a recording apparatus 100 according to the first embodiment of the invention.

In FIG. 1, an input unit 101 obtains moving image data and audio data and outputs them. In the present embodiment, although the input unit 101 inputs the moving image data and audio data which are supplied from an outside of the recording apparatus 100, it is also possible to construct the input unit 101 in such a manner that it includes an image pickup unit and a microphone, obtains a photographed moving image, and obtains audio data from the microphone. For example, the image processing construction of the invention can be also applied to a construction of recording and reproducing processes of photographed moving image data in an image pickup apparatus such as a video camera.

A control unit 102 controls the whole operation of the recording apparatus 100 in accordance with an input from an operation unit 103. The control unit 102 includes a microcomputer, a memory, and the like and controls the recording apparatus 100 in accordance with a computer program (software) stored in a non-volatile memory (not shown). The control unit 102 has therein a recording medium interface for communicating data and commands with a recording reproducing unit 106. The operation unit 103 includes various kinds of switches which can be operated by the user. By those switches, the operation unit 103 receives various kinds of instructions or the like from the user and notifies the control unit 102 of them. The operation unit 103 also includes a power switch, a switch for instructing the recording start/stop, a switch for switching a mode of the recording apparatus 100, and the like.

Upon recording, a signal processing unit 104 encodes the moving image data and audio data which are input by the input unit 101 in accordance with a well-known encoding method such as MPEG or the like and compresses an information amount. Further, the signal processing unit 104 executes processings necessary to record the moving image data and audio data and outputs information of a code amount (data amount) of the encoded moving image data and audio data to the control unit 102. Upon reproduction, the signal processing unit 104 decodes the reproduced moving image data and audio data and expands the information amount.

A memory 105 stores the moving image data and audio data. Each block of the recording apparatus 100 accesses the memory 105 and processes the moving image data and audio data. Besides the moving image data and audio data, the memory 105 stores various kinds of information such as information of a file system, management information, and the like and, further, plays a role of a work memory or the like for control which is made by the control unit 102.

The recording reproducing unit 106 writes or reads out the moving image data and audio data or various kinds of information to/from a recording medium 108. Upon recording, the recording reproducing unit 106 writes the moving image data and audio data stored in the memory 105 into the recording medium 108. Upon reproduction, the recording reproducing unit 106 reads out the moving image data and audio data from the recording medium 108 and stores into the memory 105. In the present embodiment, the recording medium 108 is a random access recording medium such as hard disk (HDD), flash memory card, or the like.

The recording reproducing unit 106 manages the moving image data and audio data and various kinds of information which are recorded into the recording medium 108 as a file in accordance with a file system such as FAT (File Allocation Table) or the like. The recording reproducing unit 106 has a well-known interface (IF) such as ATA (AT Attachment) or the like and communicates data and various kinds of commands with a recording medium IF in the control unit 102. Although the apparatus is constructed in such a manner that the recording medium 108 can be easily loaded and unloaded to/from the recording apparatus 100 by a loading and unloading mechanism (not shown), the recording apparatus 100 may be arranged in such a manner that each recording medium 108 is provided therein in a built-in manner.

In the case where a moving image file including the moving image data and audio data is written and read out into/from the recording medium 108, the control unit 102 controls the recording reproducing unit 106, reproduces file system data (management data) from the recording medium 108, and stores into the memory 105. The file system data is data showing a file name of the data recorded in the recording medium 108, a file size, a recording address of the data, and the like and is information to manage the file. The control unit 102 controls the writing and reading-out of the file in accordance with the read-out file system data. In accordance with the file being written into the recording medium 108, the control unit 102 updates the file system data stored in the memory 105. The updated file system data is recorded into the recording medium 108 by the recording reproducing unit 106.

In the present embodiment, a UUID (Universal Unique IDentifier) is added to the moving image file which is recorded into the recording medium 108 and is recorded. The UUID is identification information to unconditionally discriminate each moving image file. Each time a moving image file is newly generated, the control unit 102 generates a UUID of a different value. Therefore, by confirming the value of the UUID recorded in the recording medium 108, each moving image file can be easily discriminated.

By operating the operation unit 103, the user can instruct the switching of the operation mode of the recording apparatus 100, the recording start/stop of the moving image data, or the like. An output unit 107 outputs the reproduced moving image data and audio data to an external display apparatus or the like of the recording apparatus 100. A display unit 109 displays the moving image and various kinds of information to the display apparatus such as a liquid crystal panel or the like. A data bus 110 is used to transmit and receive data and various kinds of control commands among the units of the recording apparatus 100.

Recording Operation

Subsequently, the recording operation in the present embodiment will be described. First, when an instruction to shift to the recording mode of the moving image data is received from the operation unit 103, the recording apparatus 100 is shifted to a recording stand-by state and a recording start instruction is waited. In the recording stand-by state, the moving image corresponding to the moving image data input from the input unit 101 is displayed to the display unit 109. When the recording start instruction is input from the operation unit 103, the signal processing unit 104 reads out the moving image data which is input from the input unit 101 and stored in the memory 105 and starts the encoding of the moving image data. The encoded data is stored into the memory 105 by the signal processing unit 104.

In the present embodiment, a data rate of the data encoded by the signal processing unit 104 is lower than a data rate at which the data can be recorded into the recording medium 108. Therefore, in the present embodiment, the encoded data is temporarily stored into the memory 105. Each time a data amount of the encoded data stored in the memory 105 reaches a first predetermined amount, the recording reproducing unit 106 reads out the encoded data from the memory 105 and records into the recording medium 108. At a point of time when the encoded data stored in the memory 105 decreases to a second predetermined amount smaller than the first predetermined amount, the reading-out of the encoded data from the memory 105 is temporarily stopped and a recording process to the recording medium 108 is interrupted. In this manner, the recording process is repeated. At this time, if there are no open files, a file to record the encoded data is newly generated and opened and the encoded data is recorded as a moving image file.

Each time the writing of one time to the recording medium is completed, on the basis of a recording position or the like of the encoded data which has been written this time, the control unit 102 updates file system data (management information) stored in the memory 105. The control unit 102 controls the recording reproducing unit 106 so as to read out the updated file system data from the memory 105 and record into the recording medium.

The control unit 102 combines an individual number of the recording apparatus 100, recording time/date, the total number of recording times from the start of use in the recording apparatus, random numbers which have been prepared, and the like and generates a UUID having a numerical value of a predetermined bit length. This UUID is added as identification information (unique ID) peculiar to this file to a management information area of the moving image file as will be described hereinafter and is recorded. Each time a moving image file is newly generated in response to the recording start instruction, the control unit 102 generates a UUID of a different value.

In the present embodiment, the moving image file is recorded in accordance with an MP4 file format. FIG. 4 is a diagram illustrating an example of a construction of the MP4 file. MP4 has a tree structure as illustrated in FIG. 4 and each layer has an element called a box.

Boxes of ftyp, moov, and mdat exist in the box of the uppermost layer. Interchangeability information is stored in an ftyp box 401. Management information regarding the moving image data and audio data is stored in a moov box 402. Real data of the moving image data and audio data is stored in a mdat box 403. Upon recording, while writing the moving image data and audio data additionally into the mdat box, the data is recorded.

In this example, an ID (unique ID) peculiar to each moving image file is stored in a uuid box 404. Further, in the present embodiment, in the case where the moving image file which is being recorded is closed, a moving image file is newly opened to continue the recording, information to discriminate the file to be opened (hereinbelow, referred to as a "backwardly-continuous file") is generated. At this time, information to discriminate the file to be closed (hereinbelow, referred to as a "forwardly-continuous file") is also generated. Those two kinds of information are stored in the uuid box 404.

FIG. 5 is a diagram illustrating the contents of the identification information which is stored in the uuid box 404. UniqueID (UID) has a length of 16 bytes and a value peculiar to each moving image file is stored therein. Specifically speaking, the value of UUID is stored. In the case where a plurality of moving image files are recorded during the recording of one time for a period of time from the recording start instruction to the recording stop instruction by the user, a value of the identification information (UID) of the backwardly-continuous file is stored into NextID (NID). In the case of the end file in the recording of one time, a predetermined value, for example, "0" in this instance is stored. If the predetermined value is stored in the NID, this means that there are no backwardly-continuous files. If a plurality of moving image files were recorded during the recording of one time, a value of the identification information of the forwardly-continuous file is stored into PreID (PID). In the case of the head file in the recording of one time, a predetermined value, for example, "0" in this instance is stored. If the predetermined value is stored as a PID, this means that there are no forwardly-continuous files.

In the present embodiment, the control unit 102 monitors the size of the file which is being recorded by a notification from the recording reproducing unit 106 or the signal processing unit 104. When the size of the file being recorded reaches a threshold value (file division threshold value) to decide whether or not the file division is performed, the control unit 102 closes the file being recorded, newly generates (opens) a moving image file to continue the recording. In the present embodiment, the threshold value of the file division is determined on the basis of an upper limit of the file size decided by the file system. That is, in the present embodiment, the file division threshold value is set to a value which is smaller than the upper limit of the file size by a predetermined amount.

In the case of using an FAT32 file system, since there is such a restriction that the maximum value of one file size is equal to 4 Gigabytes (GB), the file division threshold value is set to a predetermined value smaller than 4 GB as an upper limit.

When the file size reaches the file division threshold value during the recording, the control unit 102 instructs the recording reproducing unit 106 so as to close the file which is open at present, open a new file, and continue the recording of the encoded data. As mentioned above, each time the file size reaches the file division threshold value during the recording of the moving image the recording is continued, while dividing the file.

When the recording stop instruction is received from the operation unit 103 during the recording of the moving image, the control unit 102 stops the encoding of the moving image data which is performed by the signal processing unit 104 and closes the file being recorded by the recording reproducing unit 106. In response to it, the control unit 102 instructs the recording reproducing unit 106 so as to change the contents of the file system data and record into the recording medium.

The recording process will be described hereinbelow with reference to a flowchart of FIG. 2. The process of FIG. 2 is executed by a method whereby the control unit 102 controls each unit. In the recording stand-by state, when the recording start instruction is received from the operation unit 103, the process of FIG. 2 is started. First, the control unit 102 instructs the recording reproducing unit 106 so as to open the moving image file (S201). Subsequently, the control unit 102 generates identification information (UID) of the moving image file to be recorded this time and stores into the memory 105 (S202). The control unit 102 sets "0" as a PID of the moving image file to be recorded this time and stores into the memory 105 (S203).

Subsequently, the control unit 102 controls the signal processing unit 104 so as to start the encoding of the moving image and audio data (S204) and stores the encoded data into the memory 105. The control unit 102 instructs the signal processing unit 104 so as to reduce a head frame after the recording start and generate a thumbnail image (representative image). The signal processing unit 104 reduces the head frame to generate the thumbnail image data, and stores into the memory 105.

When a data amount of the unrecorded encoded data stored in the memory 105 reaches a threshold value for writing, the control unit 102 instructs the recording reproducing unit 106 so as to write the data. The recording reproducing unit 106 reads out the encoded data from the memory 105 and records into the recording medium 108 (S205). When the data amount of the unrecorded encoded data stored in the memory 105 is less than a threshold value for stopping the writing, the control unit 102 instructs the recording reproducing unit 106 so as to stop the writing, and temporarily stop the writing of the encoded data into the recording medium 108.

When the writing process of one time is finished, the control unit 102 discriminates whether or not the file size of the moving image file being recorded at present is equal to or larger than the division threshold value for file division (S206). When the file size does not reach the division threshold value, the control unit 102 is returned to S204 and continues the recording process (S207).

If the size of the moving image file being recorded is equal to or larger than the division threshold value in S206, the control unit 102 generates a UID of the next moving image file and stores into the memory 105 (S212). A value of the UID of the next file is set into NID of the moving image file being recorded at present (S213). The control unit 102 controls the recording reproducing unit 106, stores the management data stored in the memory and including the UID, NID, PID, and thumbnail image data into the moov box, and records into the recording medium 108. The control unit 102 controls the recording reproducing unit 106, closes the moving image file being recorded (S215), and opens the new moving image file (S216). As a PID of the moving image file which is newly generated, a UID of a moving image file closed immediately-before is set and stored into the memory 105 and, after that, the processing routine is returned to S204 and the processing is continued (S217). Information showing an offset (data amount) from the head of the file of every predetermined unit of the moving image and audio data which is stored into the mdat box and other data necessary for reproduction are also stored into the moov box. In the present embodiment, a file name including the number is added to each file. When a file is newly generated, the file number is increased one by one.

When there is a recording stop instruction in S207, the control unit 102 controls the recording reproducing unit 106 and records the unrecorded encoded data stored in the memory 105 at that point of time into the recording medium 108 (S208). The control unit 102 sets "0" as an NID of the moving image file being recorded at present and stores into the memory 105 (S209). The control unit 102 controls the recording reproducing unit 106, stores the management data stored in the memory and including the UID, NID, and PID into the moov box, records into the recording medium 108 (S210), closes the file being recorded, and stops the recording (S211).

FIGS. 3A and 3B are diagrams illustrating the contents of the moving image files which are recorded in the recording medium in the recording apparatus of the present embodiment and the identification information which is stored in the uuid box 404 of each moving image file. FIG. 3A illustrates the contents of the moving image file in the case where a plurality of moving image files are not recorded for a period of time from the recording start instruction to the recording stop instruction. A moving image file 301 is generated in response to the recording start. When the recording stop is instructed before a size of the moving image file 301 reaches the division threshold value, for example, "1111" is stored as a UID and "0" (0000) is stored into the NID and PID.

FIG. 3B illustrates the contents of the moving image file in the case where three moving image files have been recorded for a period of time from the recording start instruction to the recording stop instruction. A moving image file 302 is generated in response to the recording start. When a size of the moving image file 302 reaches the division threshold value, the file 302 is closed and a file 303 is newly generated. For example, "1112" is stored as a UID of the file 303. "1113" as a UID of the next file is stored into the NID. Since the file 302 is a head file after the recording start, "0" (0000) is stored into the PID. When a size of the moving image file 303 reaches the division threshold value, the file 303 is closed and a file 304 is newly generated. "1114" as a UID of the file 304 is stored into the NID of the file 303. "1112" as a UID of the file 302 is stored into the PID of the file 303. When there is a recording stop instruction during the recording of the moving image file 304, "1113" as a UID of the file 303 is stored as a PID of the file 304. Since the file 304 is an end file in the recording of one time, "0" is stored as an NID.

As mentioned above, in the present embodiment, when a plurality of moving image files are recorded during the recording of one time, identification information of the file immediately-before and identification information of the file immediately-after are stored and is recorded. Therefore, it is possible to easily recognize that the files are moving image files recorded in the recording of one time.

In the present embodiment, when the recording is stopped or if the file size reaches the division threshold value, the NID of the moving image file being recorded is set. However, the NID may be set upon generation of the file. For example, when the file is generated, if a UID of the next moving image file can be generated, the UID of the next moving image file is set as an NID and recorded into the recording medium together with the PID. If there is a recording stop instruction during the recording of the moving image file, the value of the recorded NID is changed to a predetermined value (0).

Or, when the file is generated, the value of the NID is set to "0" and recorded together with the PID. When the size of this moving image file reaches the division threshold value, the value of the NID is changed in accordance with the UID of the next moving image file.

Reproducing Operation

Figure 6:
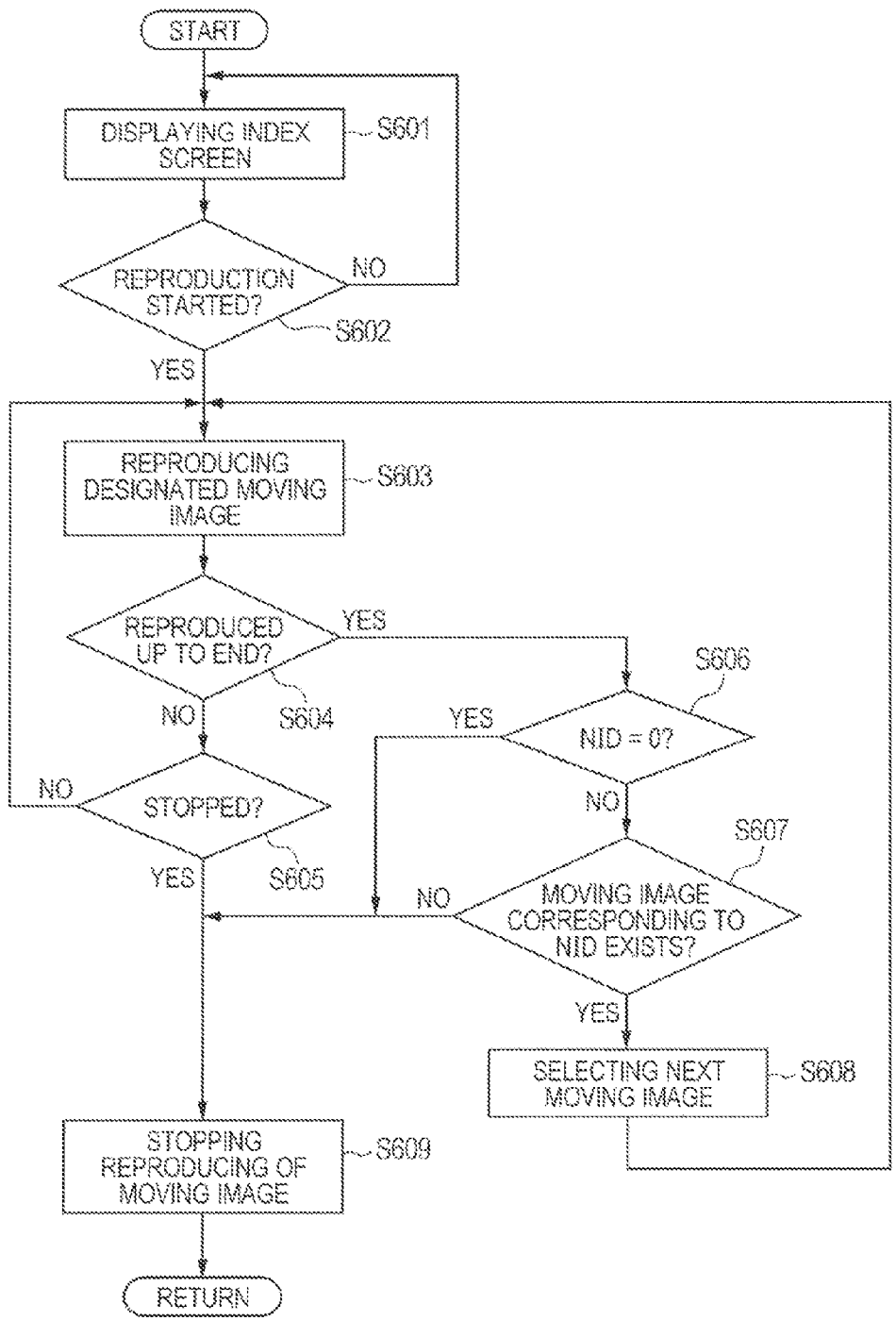
FIG. 6 is a flowchart illustrating a reproducing process in the first embodiment.

Subsequently, a process upon reproduction will be described. FIG. 6 is a flowchart illustrating a reproducing process. When a switching instruction of a reproducing mode is output by the operation unit 103, the control unit 102 controls the recording reproducing unit 106 and detects a plurality of moving image files recorded in the recording medium 108. The control unit 102 instructs the recording reproducing unit 106 so as to read out the thumbnail image data of each moving image file and store into the memory 105. The control unit 102 generates an index screen constructed with a thumbnail image of a scene of each moving image file and displays onto the display unit 109 (S601).

At this time, the control unit 102 confirms the values of the NID and PID of each moving image file corresponding to the thumbnail image displayed on the index screen. On the basis of the identification information, the control unit 102 detects whether or not the respective moving image files are a plurality of moving image files recorded during the recording of one time. The control unit 102 changes the display on the index screen so that the user can discriminate that they are the plurality of moving image files recorded by the recording instruction of one time.

For example, as illustrated in FIG. 3B, when the three moving image files 302 to 304 are recorded by the recording instruction of one time, thumbnail images of those three files are displayed to the display unit 109, respectively. Information to discriminate that those three moving image files are the moving images recorded by the photographing of one time is displayed to the index screen. A discrimination result at this time or the identification information used for the discrimination is held in the memory 105 as shown at 901 in FIG. 9, so that it can be referred to when discriminating continuity of the files upon reproduction or edition after the index screen is displayed. Particularly, even if the information is changed to information showing that there is no continuity of the identification information during the edition, the existence of the file which is continuous to the editing subject file can be properly discriminated.

Subsequently, the user selects a desired representative image from the representative images displayed on the index screen and instructs the reproduction by operating the operation unit 103 (S602). When a reproducing instruction is output, the control unit 102 instructs the recording reproducing unit 106 so as to reproduce the moving image file of the scene corresponding to the selected representative image. The recording reproducing unit 106 reproduces the designated moving image file from the recording medium 108 (S603). The signal processing unit 104 decodes the reproduced moving image file, displays to the display unit 109, and outputs to the outside from the output unit 107.

The control unit 102 discriminates whether or not the data has been reproduced up to the end of the moving image file (S604). If the data is not reproduced up to the end of the moving image file, the control unit 102 discriminates whether or not a reproduction stop instruction is output (S605). If there is no reproduction stop instruction, the reproduction of the moving image is continued as it is. When the reproduction stop instruction is output, the control unit 102 instructs the recording reproducing unit 106 so as to stop the reproduction of the moving image file. The recording reproducing unit 106 stops the reproduction of the moving image file (S606). The control unit 102 again displays the index screen to the display unit 109.

If the data is reproduced up to the end of the moving image file in S604, the control unit 102 confirms the NID of the moving image file which is being reproduced and discriminates whether or not a predetermined value "0" has been stored in the NID (S607). If "0" has been stored in the NID, since such a file is an end file recorded by the recording of one time, the control unit 102 instructs the recording reproducing unit 106 so as to stop the reproduction of the moving image file. The recording reproducing unit 106 stops the reproduction of the moving image file (S606). The control unit 102 again displays the index screen to the display unit 109.

When the NID is not equal to "0", the control unit 102 discriminates whether or not the moving image file in which the same value as that of the NID of the moving image file being reproduced is stored has been recorded in the recording medium 108 (S608). If the moving image file corresponding to the NID has been recorded, the control unit 102 selects the next moving image file corresponding to the NID (S609) and reproduces this moving image file (S603). If the moving image file corresponding to the NID is not recorded, the control unit 102 instructs the recording reproducing unit 106 so as to stop the reproduction of the moving image file. The recording reproducing unit 106 stops the reproduction of the moving image file (S606). The control unit 102 again displays the index screen to the display unit 109.

Editing Operation

Figure 7:
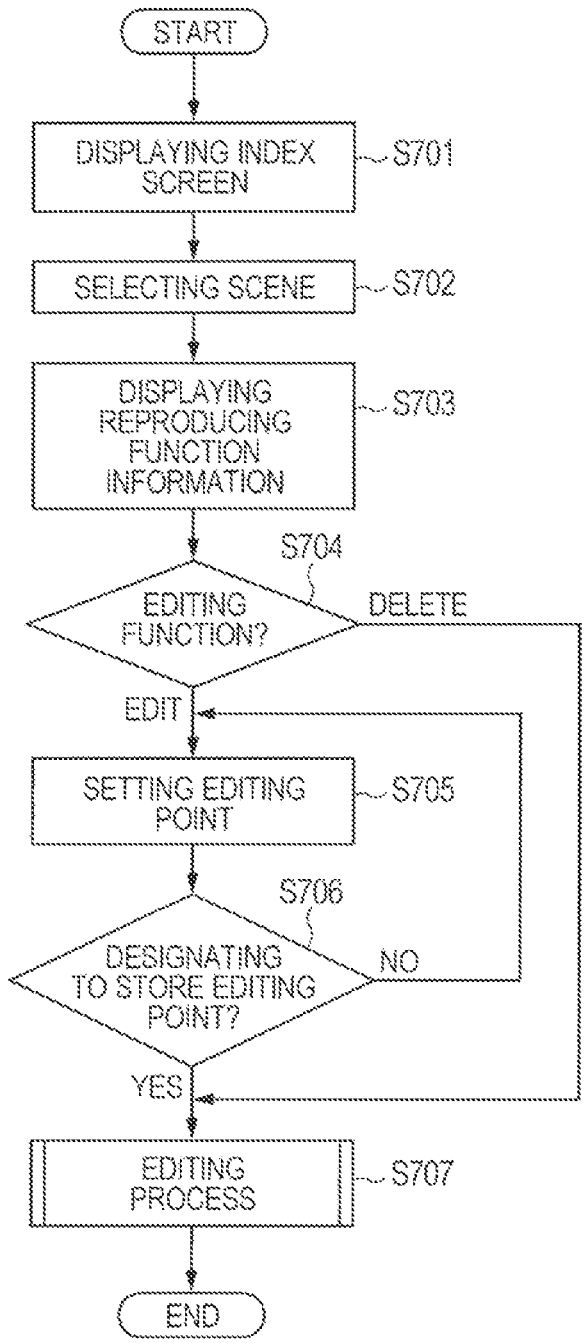
FIG. 7 is a flowchart illustrating an editing process in the first embodiment.
Figure 8:
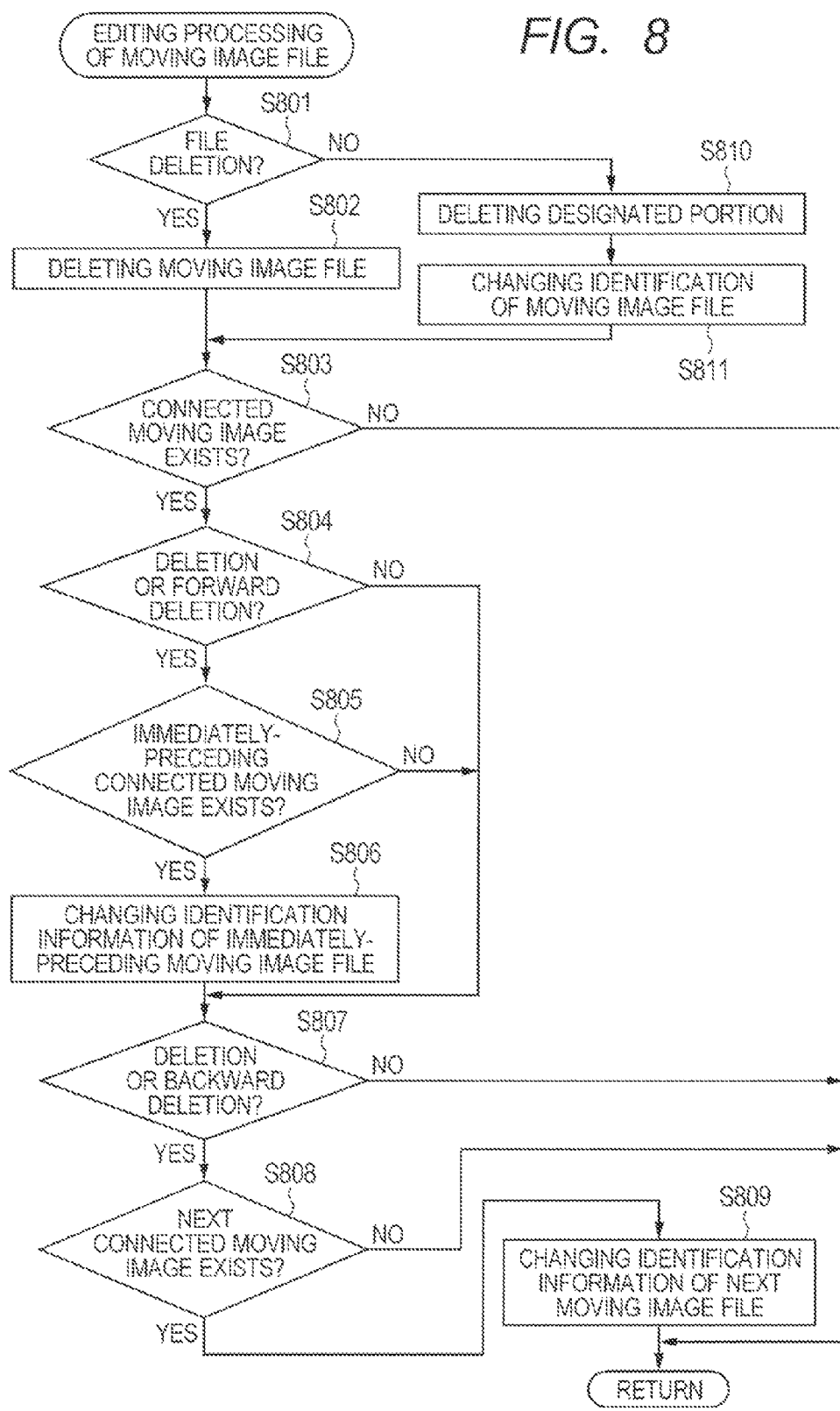
FIG. 8 is a flowchart illustrating an editing process of the moving image file.

Subsequently, an editing process will be described. FIGS. 7 and 8 are flowcharts illustrating the editing process in the present embodiment. First, when there is a switching instruction of the reproducing mode by the operation unit 103, the control unit 102 reads out the thumbnail image data of each scene and displays the index screen to the display unit 109 by a process similar to that of the foregoing reproducing operation (S701).

It is now assumed that the six moving image files shown at 901 in FIG. 9 have been recorded in the recording medium 108. Reference numeral 901 in FIG. 9 denotes the moving image files recorded in the recording medium 108 and their identification information. The five moving image files MVI_0001.MP4 to MVI_0005.MP4 are moving image files recorded through the file division for a period of time from the recording start instruction to the recording stop instruction of one time by the user. The moving image file MVI_0006.MP4 is a moving image file recorded for a period of time from the recording start instruction to the recording stop instruction of one time by the user.

Since the moving image file MVI_0001.MP4 is a head file at the time of the recording start, "0000" is stored as a PID. "1112" as a UID of the next moving image file MVI_0002.MP4 is stored into the NID of MVI_0001.MP4.

"1111" as a UID of the moving image file MVI_0001.MP4 of immediately-before is stored into the PID of the moving image file MVI_0002.MP4. "1113" as a UID of the next moving image file MVI_0003.MP4 is stored into the NID.

"1112" as a UID of the moving image file MVI_0002.MP4 of immediately-before is stored into the PID of the moving image file MVI_0003.MP4. "1114" as a UID of the next moving image file MVI_0004.MP4 is stored into the NID.

"1113" as a UID of the moving image file MVI_0003.MP4 of immediately-before is stored into the PID of the moving image file MVI_0004.MP4. "1115" as a UID of the next moving image file MVI_0005.MP4 is stored into the NID.

"1114" as a UID of the moving image file MVI_0004.MP4 of immediately-before is stored into the PID of the moving image file MVI_0005.MP4. Since the moving image file MVI_0005.MP4 is an end file at the time of the recording stop, a predetermined value "0000" is stored into the NID.

Since the moving image file MVI_0006.MP4 is a file recorded by the recording start instruction and the recording stop instruction of one time, the predetermined value "0000" is stored into both of the NID and PID.

The control unit 102 controls the signal processing unit 104 so as to display an index screen including thumbnail images of those six moving image files to the display unit 109 (S701). Subsequently, when the user selects any one of the displayed thumbnail images by operating the operation unit 103, the control unit 102 instructs the recording reproducing unit 106 and the signal processing unit 104 so as to reproduce and display the head screen of the selected moving image (S702).

Subsequently, when it is detected that the user has instructed a display of the reproducing function onto the screen by operating the operation unit 103, the control unit 102 displays a selection screen of the reproducing function to the display unit 109 (S703). The user instructs a function such as reproduction, edition, scene movement, or the like by operating the operation unit 103 (S704).

For example, when the user instructs the reproduction, the control unit 102 controls the recording reproducing unit 106 and the signal processing unit 104 so as to reproduce the selected moving image file and display a reproduced moving image to the display unit 109. When the reproduction of the next scene or previous scene is instructed, the control unit 102 displays a head screen of the moving image file before or after the moving image file selected at present. When the deletion is instructed, the control unit 102 executes a deleting process of the selected moving image file and displays the index screen as will be described hereinafter. When the edition is instructed, an edition point of the selected moving image file is set by the user (S705). When the storage of the edition point is instructed, the control unit 102 stores the set edition point and information of a type of editing into the memory 105 (S706). In the present embodiment, the apparatus has a function of a deleting process for deleting the whole moving image file. In the present embodiment, the apparatus has: a backward deletion processing as a process for deleting the file contents in a range from the edition point set by the user to the end of the moving image file; and a forward deletion processing as a process for deleting the file contents in a range from the head of the moving image file to the edition point set by the user. If the whole moving image file is deleted, the file itself including the identification information is deleted. However, if the forward deletion processing and the backward deletion processing are executed, only the real data of the moving image and audio of the range for deletion is deleted from the file and the file including the identification information is not deleted.

If the deletion or edition is instructed by the user, the control unit 102 executes an editing process (S707).

FIG. 8 is a flowchart illustrating the editing process of the moving image file. First, the control unit 102 discriminates whether or not the deletion of the file has been instructed (S801). When the file deletion is instructed, the control unit 102 instructs the recording reproducing unit 106 so as to delete the selected moving image file from the recording medium 108 (S802). If the file deletion is not instructed, the process is a forward deleting edition or backward deleting edition. Therefore, in the selected moving image file, the control unit 102 deletes a portion of the selected moving data on the basis of the edition point designated by the user (S810). The management information in the moving image file of the editing subject and the identification information are changed in accordance with the deleted portion (S811). Specifically speaking, in the case of the forward deletion processing, the control unit 102 discriminates whether or not the PID of the moving image file of the editing subject is equal to the predetermined value "0". If the PID is equal to a value other than the predetermined value, it is changed to "0". In the case of the backward deletion processing, the control unit 102 discriminates whether or not the NID of the moving image file of the editing subject is equal to the predetermined value "0". If the NID is equal to a value other than the predetermined value, it is changed to "0". In the case of the forward deletion processing and the backward deletion processing, the control unit 102 discriminates whether or not the NID and PID of the moving image file of the editing subject are equal to the predetermined value "0". If they are equal to values other than the predetermined value, they are changed to "0".

Subsequently, on the basis of the identification information of the moving image file of the editing subject, the control unit 102 confirms whether or not there is a moving image file connected to the moving image file of the editing subject (S803). As mentioned above, such a confirmation can be properly performed even if the identification information has been changed to the predetermined value "0000" in S811 by using information at the time of detection of continuous files when the index screen is generated at the time of the operation start. That is, the identification information of the moving image file before it is deleted in S802 or the identification information of the moving image file before it is changed in S811 has been stored in the memory 105. In S803, the control unit 102 discriminates whether or not there is a connected moving image in accordance with the identification information stored in the memory 105. For example, if at least one of the PID and NID of the moving image file of the editing subject is not equal to the predetermined value "0", since the moving image file which is continuous immediately-before or immediately-after is recorded, it is determined that there is a connected file. If there are no connected moving images as a result of the discrimination, the control unit 102 finishes the processing routine.

If the connected moving image is recorded, the control unit 102 discriminates whether or not the present editing process is the file deletion or the forward deletion processing (S804). In the case of the file deletion or the forward deletion processing, the control unit 102 discriminates whether or not the connected moving image of immediately-before has been recorded (S805). This discrimination and a similar discrimination, which will be described hereinbelow, can be also properly performed in a manner similar to S803. For example, when the PID of the moving image file of the editing subject is not equal to the predetermined value "0000", the moving image file of immediately-before has been recorded. If the connected moving image of immediately-before has been recorded, the control unit 102 detects the moving image file of immediately-before on the basis of the PID of the moving image file of the editing subject and changes the identification information of the moving image file of immediately-before, that is, the NID in this instance to the predetermined value "0000" (S806). If the present editing process is not the deletion or the forward deletion processing in S804 or if the connected moving image of immediately-before is not recorded in S805, the processing routine advances to S807.

The control unit 102 discriminates whether or not the present editing process is the file deletion or the backward deletion processing (S807). In the case of the file deletion or the backward deletion processing, the control unit 102 discriminates whether or not the next connected moving image has been recorded (S808). For example, if the NID of the moving image file of the editing subject is not equal to the predetermined value "0000", the next moving image file has been recorded. If the next connected moving image has been recorded, the control unit 102 detects the next moving image file on the basis of the NID of the moving image file of the editing subject and changes the identification information of the next moving image file, that is, the PID in this instance to the predetermined value "0000" (S809). If the present editing process is not the deletion or the backward deletion processing in S807 or if the next connected moving image is not recorded in S808, the processing routine is finished.

Identification information in the case where the moving image file MVI_0003.MP4 among the six moving image files shown at 901 in FIG. 9 is deleted is shown at 902 in FIG. 9. Since the NID of the moving image file MVI_0003.MP4 is equal to "1114" and its PID is equal to "1112", it will be understood that the moving image file of immediately-before and the next connected moving image have been recorded. Therefore, the control unit 102 changes the NID of the moving image file MVI_0002.MP4 immediately-before the moving image file MVI_0003.MP4 to the predetermined value "0000". The control unit 102 also changes the PID of the next moving image file MVI_0004.MP4 of the moving image file MVI_0003.MP4 to the predetermined value "0000".

Identification information in the case where the moving image file MVI_0003.MP4 is forward deletion processed is shown at 1001 in FIG. 10. In the case where the moving image file MVI_0003.MP4 is forward deletion processed, the control unit 102 changes the PID of the moving image file MVI_0003.MP4 to the predetermined value "0000" and changes the NID of the moving image file MVI_0002.MP4 of immediately-before to the predetermined value "0000". Identification information in the case where the moving image file MVI_0003.MP4 is backward deletion processed is shown at 1002 in FIG. 10. In the case where the moving image file MVI_0003.MP4 is backward deletion processed, the control unit 102 changes the NID of the moving image file MVI_0003.MP4 to the predetermined value "0000" and changes the PID of the next moving image file MVI_0004.MP4 to the predetermined value "0000". Identification information in the case where the moving image file MVI_0003.MP4 is forward deletion processed and backward deletion processed is shown at 1003 in FIG. 10. In the case where the moving image file MVI_0003.MP4 is forward deletion processed and backward deletion processed, the control unit 102 changes both of the NID and PID of the moving image file MVI_0003.MP4 to the predetermined value "0000". Further, the control unit 102 changes the NID of the moving image file MVI_0002.MP4 of immediately-before to the predetermined value "0000" and changes the PID of the next moving image file MVI_0004.MP4 to the predetermined value "0000".

As mentioned above, in the present embodiment, in the case where the plurality of moving image files have been recorded during the recording of one time, the identification information of the file of immediately-before and the file of immediately-after is stored as identification information into the moving image files and recorded. Therefore, upon reproduction, the user can easily recognize that the files are the moving image files recorded by the recording of one time.

By deciding the moving image file to be reproduced next on the basis of those identification information and continuously reproducing, the moving image files recorded during the recording of one time can be continuously reproduced.

In the present embodiment, when the deletion or the editing process such as a partial deletion or the like of any one of the moving image files is executed, the identification information is changed in accordance with the contents of the editing process (control unit). Therefore, after the edition, since the moving images are not continuously reproduced in the portions before and after the deleted portion, such a situation that the moving images in which the continuity was lost by the editing process are continuously reproduced can be prevented.

In the present embodiment, although the threshold value to divide the file has been set to the predetermined size, for example, the file may be divided each time the moving image data of an amount corresponding to a predetermined time is recorded. In this case, the threshold value is set to a predetermined recording time length. The control unit 102 generates a new file and counts an elapsed time from the recording start. When the predetermined time elapses, the control unit 102 outputs a file dividing instruction to the recording reproducing unit 106. In the present embodiment, although the apparatus for recording the moving image data and audio data has been described, the invention can be also similarly applied to an apparatus for recording other information data which was input.

In the present embodiment, although the moving image and audio have been recorded in the MP4 file format, they can be also recorded in another file format such as an MOV file format or the like.

In the present embodiment, although the apparatus has been constructed in such a manner that upon reproduction, the moving image files generated during the recording of one time are continuously reproduced on the basis of the identification information, it may be constructed in such a manner that if one moving image file is reproduced up to the end, the index screen is displayed without reproducing the next moving image.

Second Embodiment

Subsequently, the second embodiment will be described. Also in this embodiment, a construction of the recording apparatus 100 and its fundamental operation are similar to those in the first embodiment. Also in the second embodiment, although the various kinds of identification information illustrated in FIG. 5 are recorded, a predetermined value showing invalidity, for example, "−1" is stored into the PID of each moving image file which is recorded at the time of photographing and is recorded. The UID and NID are recorded in a manner similar to the first embodiment.

Recording Operation

Figure 11:
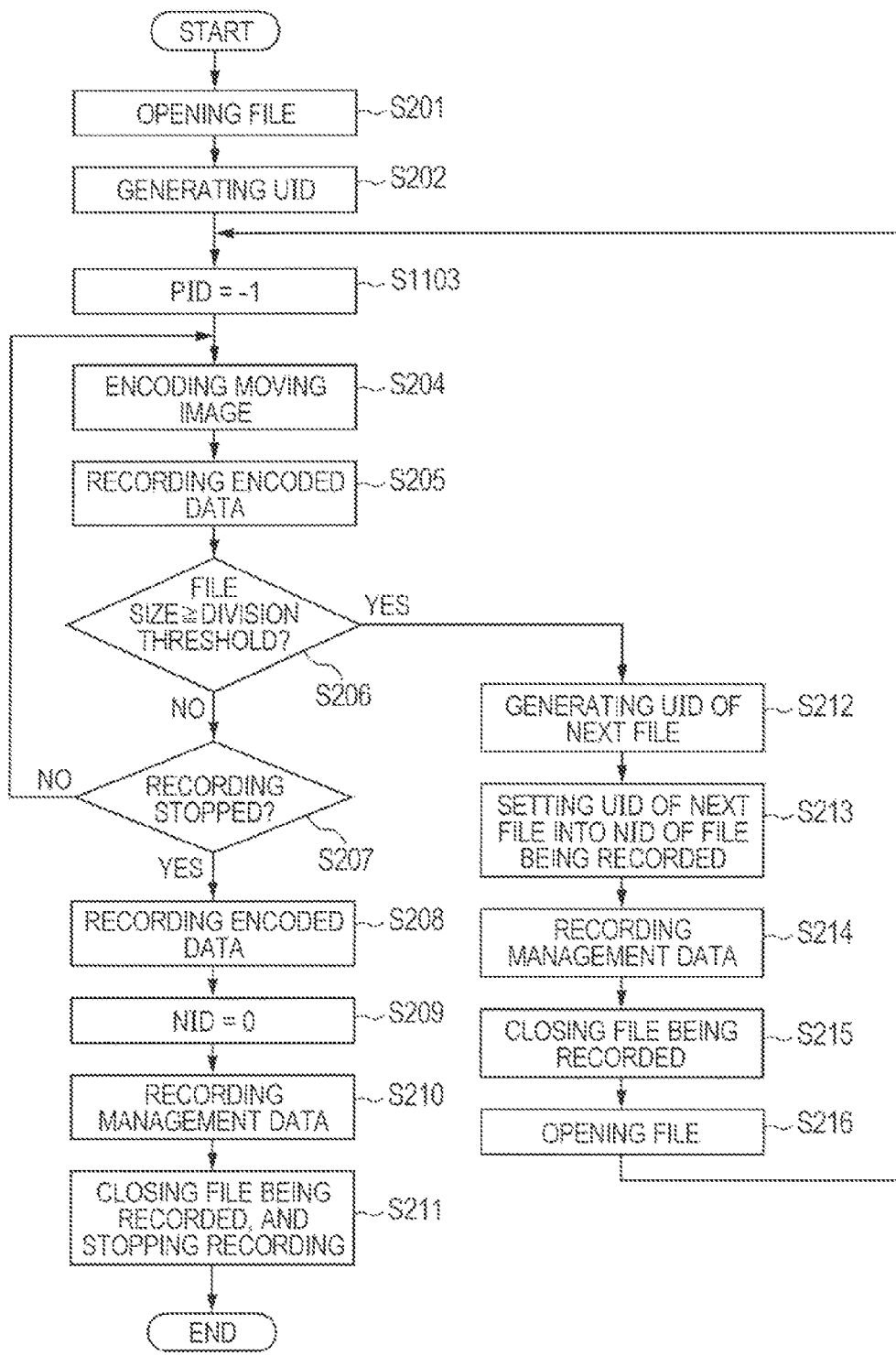
FIG. 11 is a flowchart illustrating a recording process in the second embodiment.

FIG. 11 is a flowchart illustrating the recording process in the second embodiment. In FIG. 11, processings similar to those in FIG. 2 are designated by the same step numbers and their detailed description is omitted here. The process in FIG. 11 is executed by controlling each unit by the control unit 102.

The process in FIG. 11 differs from that of FIG. 2 with respect to a point that in S1103, a predetermined value (−1) showing invalidity is set as a PID. After a file is newly generated in S216, the processing routine is returned to S1103 and the predetermined value (−1) showing invalidity is set as a PID. Therefore, the setting of the PID which is performed in S217 in FIG. 2 is not performed. Other recording process is similar to that in the first embodiment.

Figures 12A, 12B:
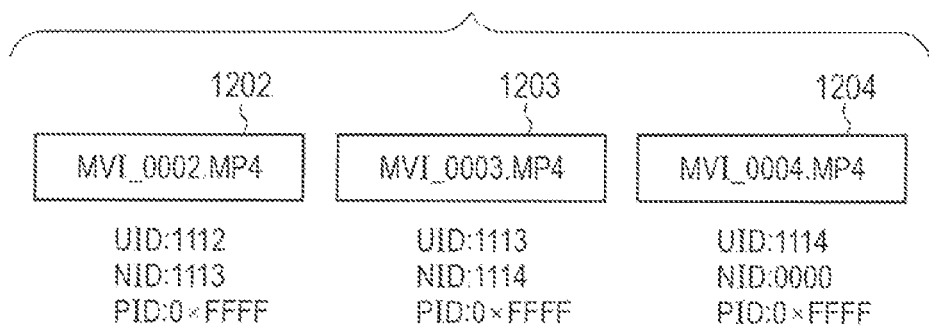
FIGS. 12A and 12B are diagrams illustrating states of moving image files recorded in the second embodiment.

FIGS. 12A and 12B are diagrams illustrating the contents of the moving image files which are recorded in the recording medium by the recording apparatus in the present embodiment. FIG. 12A illustrates the contents of the moving image file in the case where a plurality of moving image files are not recorded for a period of time from the recording start instruction to the recording stop instruction. A moving image file 1201 is generated in response to the recording start and in the case where the recording stop is instructed before a size of the moving image file 1201 reaches the division threshold value, "0" (0000) is stored into the NID and "−1" (hexadecimal number with a sign) is recorded into the PID.

FIG. 12B illustrates the contents of the moving image files in the case where three moving image files are recorded for a period of time from the recording start instruction to the recording stop instruction. A moving image file 1202 is generated in response to the recording start. When a size of the moving image file 1202 reaches the division threshold value, the file 1202 is closed and a file 1203 is newly generated. For example, "1113" is stored as a UID of the file 1203 and "1114" as a UID of the next file is stored into the NID. When a size of the moving image file 1203 reaches the division threshold value, the file 1203 is closed and a file 1204 is newly generated. For example, "1114" is stored as a UID of the file 1204. If there is a recording stop instruction during the recording of the moving image file 1203, since the file 1204 is an end file in the recording of one time, "0" is stored as an NID. "−1" showing invalidity is recorded as a PID of each file.

Reproducing Operation

Subsequently, the process upon reproduction will be described. In the first embodiment, the file in which "0" is recorded in the PID is a head file recorded by the recording of one time. In the present embodiment, since "−1" is always set in the PID and it is invalid, first, the control unit 102 confirms the UID and NID of each recorded moving image file in order of the file number. The control unit 102 presumes that the files in a range from the next file of the file in which "0" has been recorded in the NID up to the file in which the NID is subsequently equal to "0" are the files recorded by the recording of one time. The control unit 102 changes the display of the index screen in such a manner that the user can discriminate that the files are the plurality of moving image files recorded by the recording instruction of one time. A subsequent process is similar to that in the first embodiment. It is also possible to construct in such a manner that upon reproduction, a plurality of files recorded by the recording of one time are confirmed from the values of the UID and NID of each file without using the file numbers, and their reproducing order is determined. In a manner similar to the first embodiment, also in the present embodiment, if a detection result about the continuity of the moving image files recorded by the recording instruction of one time is held as shown at, for example, 1301 in FIG. 13, the discrimination about the continuity can be easily performed by referring to it in the reproduction and edition.

In this manner, in the present embodiment, if a plurality of moving image files are recorded during the recording of one time, the identification information of the file of immediately-after is stored into the moving image file and recorded. Therefore, the user can easily recognize that the files are moving image files recorded by the recording of one time.

Although the value showing invalidity is recorded as a PID in the second embodiment, it is also possible to construct in such a manner that the user can select either a mode in which the PID is recorded like a first embodiment or a mode in which the PID is invalidated.

Editing Operation

Subsequently, the process upon edition will be described. Also in the second embodiment, three processes such as file deletion, forward deletion processing, and backward deletion processing can be executed as an editing process. The editing process is executed by performing processes illustrated in flowcharts of FIGS. 7 and 8. In the second embodiment, since the invalid value is set in the PID, in S803 to S809, a connected moving image, a moving image file of immediately-before, and a next moving image file are detected on the basis of the value of the NID. Also in this case, the detection can be easily performed with reference to the detection result about the continuity at the time of generating the index screen mentioned above.

In 5811, in the case of the forward deletion processing, since the PID of the moving image file of the editing subject is the invalid value, the PID is not changed here. The change in PID in S809 is not performed either.

In S803, the control unit 102 confirms whether or not there is a moving image file connected to the moving image file of the editing subject on the basis of the NID of each moving image file and the UID of the moving image file of the editing subject. When the NID of the moving image file of the editing subject is not equal to the predetermined value "0", the control unit 102 determines that there is a connected file. The control unit 102 detects the value of the UID of the moving image file of the editing subject and detects the moving image file in which the same value as that of the UID is stored as an NID from the moving image files recorded in the recording medium 108. The moving image file in which the same value as that of the UID of the moving image file of the editing subject is stored in the NID is a connected file. If there are no connected moving images as a result of the discrimination, the control unit 102 finishes the processing routine.

If the connected moving image has been recorded, the control unit 102 discriminates whether or not the present editing process is the file deletion or the forward deletion processing (S804). In the case of the file deletion or the forward deletion processing, the control unit 102 discriminates whether or not the connected moving image of immediately-before has been recorded (S805). For example, when there is a moving image file in which the UID of the moving image file of the editing subject is set in the NID, it is to be a moving image file recorded immediately-before. If the connected moving image file of immediately-before is recorded, the control unit 102 changes the identification information of the moving image file of immediately-before, that is, the NID to the predetermined value "0000" (S806). If the present editing process is not the deletion or the forward deletion processing in S804 or if the connected moving image of immediately-before is not recorded in S805, the processing routine advances to S807.

In S807, the control unit 102 discriminates whether or not the present editing process is the file deletion or the backward deletion processing. In the case of the file deletion or the backward deletion processing, the control unit 102 discriminates whether or not the next connected moving image is recorded (S808). For example, if the NID of the moving image file of the editing subject is not equal to the predetermined value "0000", the next moving image file is recorded. If the next connected moving image is recorded, the control unit 102 advances the process to S809. Since the PID is set to invalidity in the present embodiment, the PID as identification information of the next moving image file is not changed (S809). Or, "−1" (hexadecimal notation) may be set again. If the present editing process is not the deletion or the backward deletion processing in S807 or if the next moving image file is not recorded in S808, the processing routine is finished. As mentioned above, in the present embodiment, the processing in S807 to S809 can be omitted. For example, it is also possible in S807 to construct in such a manner that whether or not the PID of the moving image file of the editing subject is set to invalidity is discriminated and when it is invalid, the processing routine is finished.

In the second embodiment, the moving image files recorded in the recording medium 108 and their identification information are shown at 1301 in FIG. 13. The five moving image files MVI_0001.MP4 to MVI_0005.MP4 are moving image files recorded for a period of time from the recording start instruction to the recording stop instruction of one time by the user. The moving image file MVI_0006.MP4 is a moving image file recorded for a period of time from the recording start instruction to the recording stop instruction of one time by the user. A value "−1" showing invalidity is stored in the PID of each moving image file.

"1112" as a UID of the next moving image file MVI_0002.MP4 is stored into the NID of the moving image file MVI_0001.MP4. "1113" as a UID of the next moving image file MVI_0003.MP4 is stored into the NID of the moving image file MVI_0002.MP4. "1114" as a UID of the next moving image file MVI_0004.MP4 is stored into the NID of the moving image file MVI_0003.MP4. "1115" as a UID of the next moving image file MVI_0005.MP4 is stored into the NID of the moving image file MVI_0004.MP4. Since the moving image file MVI_0005.MP4 is an end file at the time of the recording stop, the predetermined value "0000" is stored into the NID.

Since the moving image file MVI_0006.MP4 is a file recorded by the recording start instruction and the recording stop instruction of one time, the predetermined value "0000" is stored into the NID.

Identification information in the case where the moving image file MVI_0003.MP4 among the six moving image files shown at 1301 in FIG. 13 is deleted is shown at 1302 in FIG. 13. Since the same value as that of the UID of the moving image file MVI_0003.MP4 is stored in the NID of the moving image file MVI_0002.MP4, it will be understood that the moving image file of immediately-before is recorded. Therefore, the control unit 102 changes the NID of the moving image file MVI_0002.MP4 immediately-before the moving image file MVI_0003.MP4 to the predetermined value "0000".

Identification information in the case where the moving image file MVI_0003.MP4 is forward deletion processed is shown at 1401 in FIG. 14. In the case where the moving image file MVI_0003.MP4 was forward deletion processed, the control unit 102 does not change the identification information of the moving image file MVI_0003.MP4 but changes the NID of the moving image file MVI_0002.MP4 of immediately-before to the predetermined value "0000".

Identification information in the case where the moving image file MVI_0003.MP4 is backward deletion processed is shown at 1402 in FIG. 14. In the case where the moving image file MVI_0003.MP4 is backward deletion processed, the control unit 102 changes the NID of the moving image file MVI_0003.MP4 to the predetermined value "0000" and does not change the identification information of other moving image files.

Identification information in the case where the moving image file MVI_0003.MP4 is forward deletion processed and was backward deletion processed is shown at 1403 in FIG. 14. In the case where the moving image file MVI_0003.MP4 was forward deletion processed and is backward deletion processed, the control unit 102 changes both of the NID of the moving image file MVI_0003.MP4 to the predetermined value "0000". Further, the control unit 102 changes the NID of the moving image file MVI_0002.MP4 of immediately-before to the predetermined value "0000".

As mentioned above, in the present embodiment, the identification information showing the moving image file of immediately-before and the next moving image file is recorded as identification information of the plurality of moving image files generated during the recording of one time. Upon reproduction, the moving image file to be subsequently reproduced is decided on the basis of the identification information and is continuously reproduced. Therefore, the moving image files generated during the recording of one time can be continuously reproduced.

In the present embodiment, in the case where the deletion or the editing process such as partial deletion or the like of any one of the moving image files is executed, the identification information is changed in accordance with the contents of the editing process. Therefore, after the edition, since the moving images are not continuously reproduced in the portions before and after the deleted portion, such a situation that the moving images in which the continuity is lost by the editing process are continuously reproduced can be prevented.

Third Embodiment

Subsequently, the third embodiment will be described. Also in this embodiment, a construction of the recording apparatus 100 and its fundamental operation are similar to those in the first embodiment. Also in the third embodiment, the various kinds of identification information illustrated in FIG. 5 are recorded. In this embodiment, the UID of the moving image file of immediately-before is stored into the PID like the first embodiment.

In the present embodiment, in the case where the deletion or the editing process such as partial deletion or the like of the moving image file was executed, the identification information of the moving image file of the editing subject is changed and the identification information of other moving image files is not changed (processings in S803 to S809 in FIG. 8).

Figure 15:
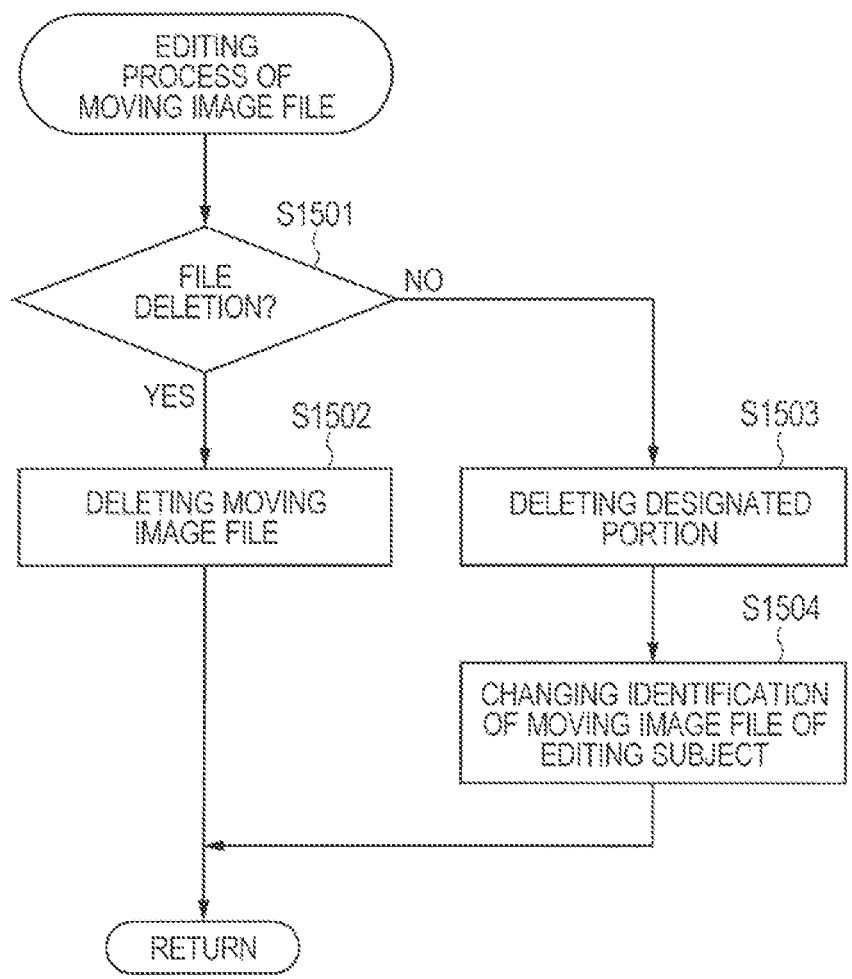
FIG. 15 is a flowchart illustrating an editing process in the third embodiment.

FIG. 15 is a flowchart illustrating the editing process in S707 in the third embodiment. First, the control unit 102 discriminates whether or not the deletion of the file is instructed (S1501). If the deletion of the file is instructed, the control unit 102 instructs the recording reproducing unit 106 so as to delete the selected moving image file from the recording medium 108 (S1502). When the deletion of the file is not instructed, the process is a forward deletion processing or backward deletion processing. Therefore, in the selected moving image file, the control unit 102 deletes a part of the selected moving image data on the basis of the edition point designated by the user (S1503). In accordance with the deleted portion, the management information and identification information in the moving image file of the editing subject is changed (S1504).

For example, a process will be executed as follows in a manner similar to the first embodiment. In the case of the forward deletion processing, the control unit 102 discriminates whether or not the PID of the moving image file of the editing subject is equal to the predetermined value "0". If the PID is equal to a value other than the predetermined value, it is changed to "0". In the case of the backward deletion processing, the control unit 102 discriminates whether or not the NID of the moving image file of the editing subject is equal to the predetermined value "0". If the NID is equal to a value other than the predetermined value, it is changed to "0". In the case of the forward deletion processing and the backward deletion processing, the control unit 102 discriminates whether or not the NID and PID of the moving image file of the editing subject are equal to the predetermined value "0". If they are equal to values other than the predetermined value, they are changed to "0".

The identification information in the case where the moving image file MVI_0003.MP4 among the six moving image files shown at 901 in FIG. 9 is edited is illustrated in FIG. 16. Identification information in the case where the moving image file MVI_0003.MP4 is deleted is shown at 1601 in FIG. 16. The moving image file MVI_0003.MP4 is deleted and the identification information of other moving image files is not changed.

Identification information in the case where the moving image file MVI_0003.MP4 is forward deletion processed is shown at 1602 in FIG. 16. In the case where the moving image file MVI_0003.MP4 is forward deletion processed, the control unit 102 changes the PID of the moving image file MVI_0003.MP4 to the predetermined value "0000". Identification information in the case where the moving image file MVI_0003.MP4 is backward deletion processed is shown at 1603 in FIG. 16. In the case where the moving image file MVI_0003.MP4 is backward deletion processed, the control unit 102 changes the NID of the moving image file MVI_0003.MP4 to the predetermined value "0000". Identification information in the case where the moving image file MVI_0003.MP4 is forward deletion processed and was backward deletion processed is shown at 1604 in FIG. 16. In the case where the moving image file MVI_0003.MP4 is forward deletion processed and is backward deletion processed, the control unit 102 changes both of the NID and PID of the moving image file MVI_0003.MP4 to the predetermined value "0000".

As illustrated in FIG. 16, in any of the cases of the deletion, the forward deletion processing, and the backward deletion processing, the control unit 102 does not change the identification information of the moving image files other than the moving image file of the editing subject.

Figure 17:
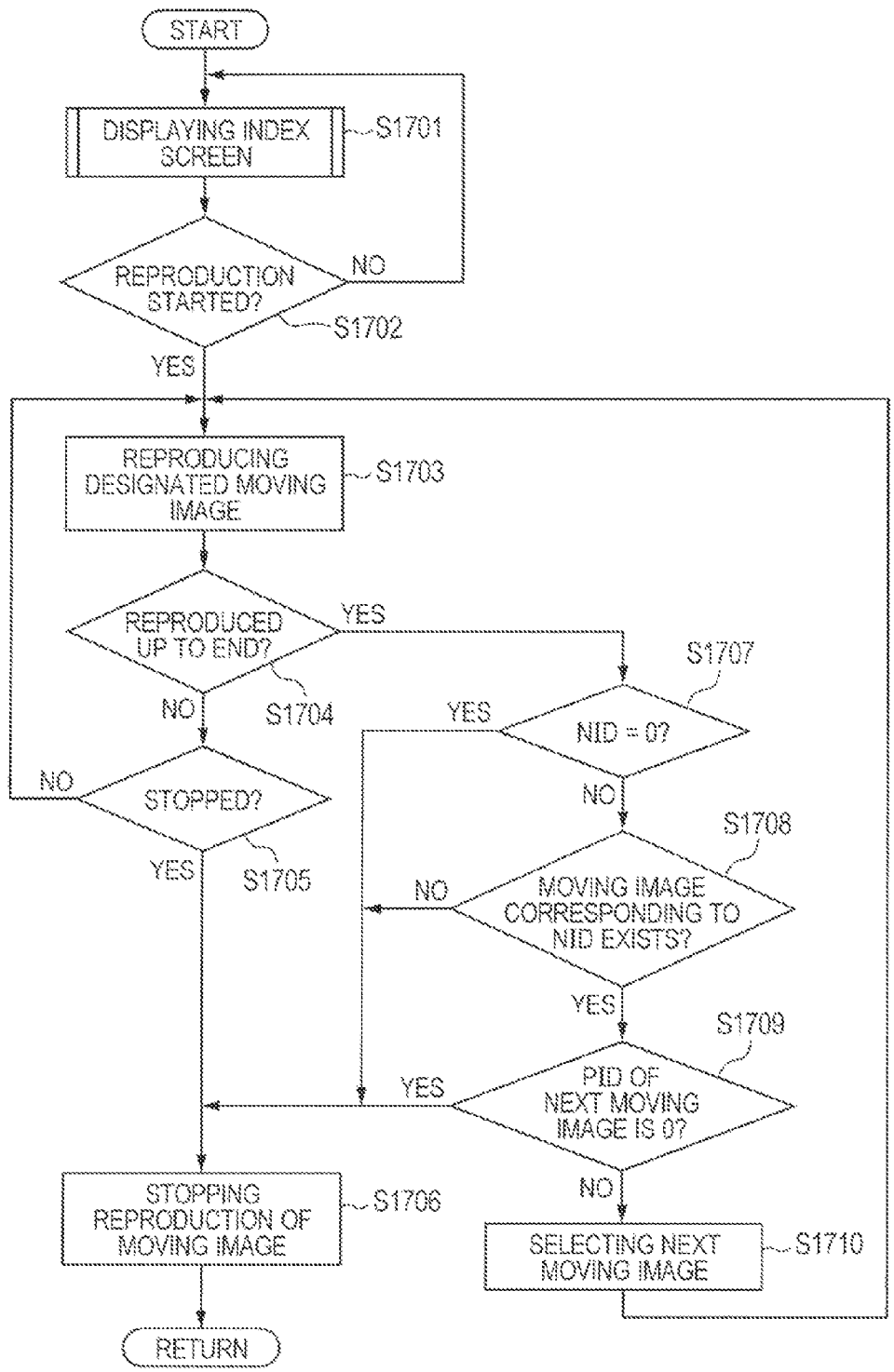
FIG. 17 is a flowchart illustrating a reproducing process in the third embodiment.

Subsequently, a reproducing process in the present embodiment will be described. FIG. 17 is a flowchart illustrating a reproducing process in the third embodiment. If a switching instruction of a reproducing mode is output by the operation unit 103, the control unit 102 controls the recording reproducing unit 106 and detects the plurality of moving image files recorded in the recording medium 108. The control unit 102 instructs the recording reproducing unit 106 so as to read out the thumbnail image data of each moving image file and store into the memory 105. The control unit 102 generates an index screen constructed by a thumbnail image of a scene of each moving image file and displays onto the display unit 109 (S1701). At this time, the control unit 102 changes the display of the index screen in such a manner that the user can discriminate that the files are the plurality of moving image files recorded by the recording instruction of one time.

Figure 18:
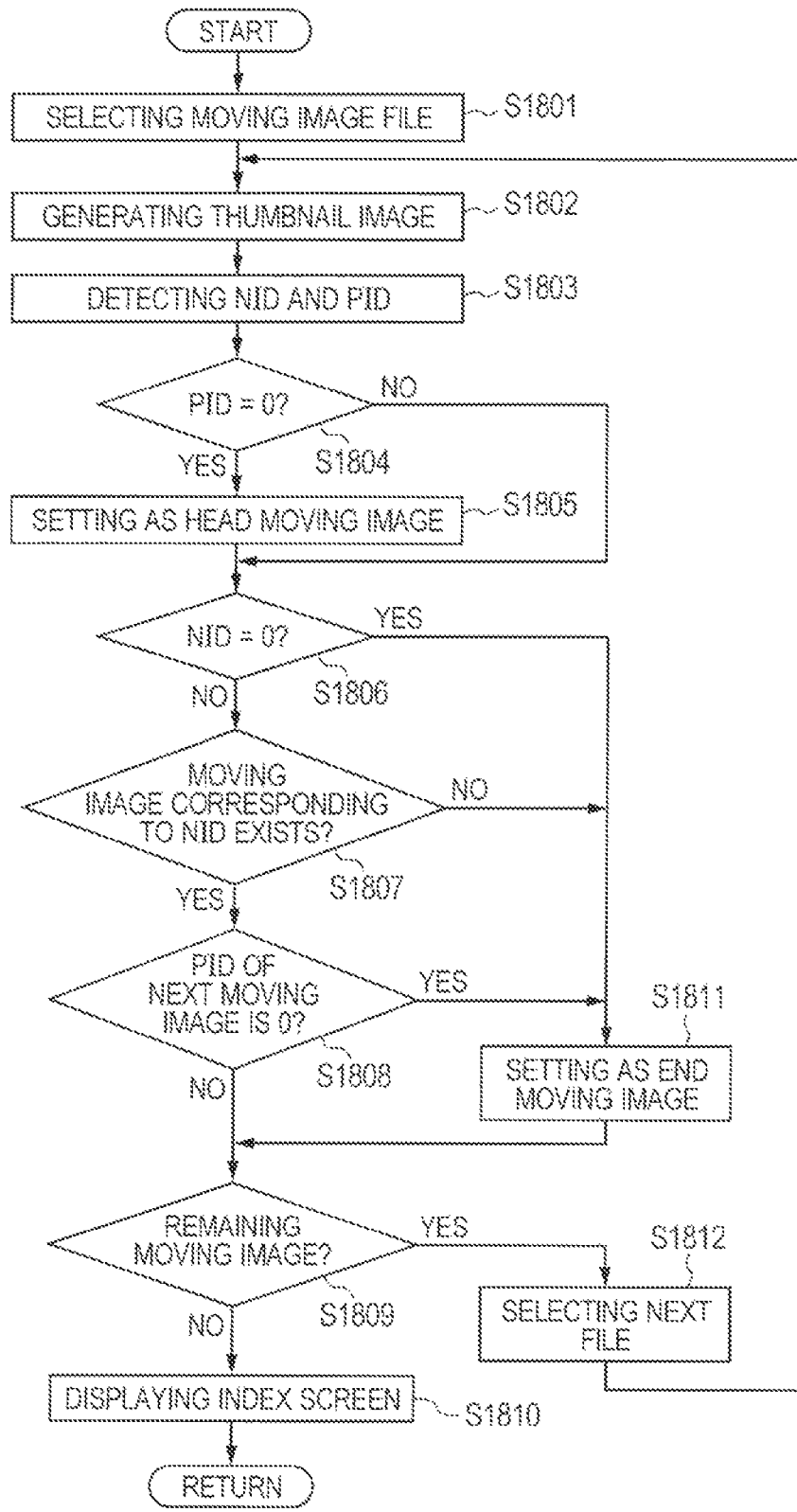
FIG. 18 is a flowchart illustrating a displaying process of an index screen in the third embodiment.

FIG. 18 is a flowchart illustrating a displaying process of an index screen in S1701.

In FIG. 18, the control unit 102 selects one of the moving image files which are displayed on the index screen (S1801). The control unit 102 instructs the recording reproducing unit 106 and the signal processing unit 104 so as to reproduce the selected moving image file and generate a thumbnail image and the generated thumbnail image is stored in the memory 105 (S1802). Subsequently, the control unit 102 detects the NID and PID of the selected moving image file (S1803) and discriminates whether or not the value of the PID is equal to the predetermined value "0" (S1804). When the value of the PID is equal to the predetermined value, the control unit 102 sets the selected moving image file as a head of the moving images recorded by the recording of one time (S1805).

Subsequently, the control unit 102 discriminates whether or not the NID of the selected moving image file is equal to the predetermined value "0" (S1806). If the NID is equal to "0", the control unit 102 sets the selected moving image file as an end of the moving images recorded by the recording of one time (S1811). When the NID is not equal to the predetermined value, the control unit 102 discriminates whether or not the moving image file in which the same value as that of the NID is stored as a UID is recorded in the recording medium 108 (S1807). If the moving image file corresponding to the NID is not recorded, the selected moving image file is set as an end of the moving images recorded by the recording of one time (S1811). If the moving image file corresponding to the NID is recorded, the control unit 102 discriminates whether or not the PID of the next moving image file corresponding to the NID is equal to the predetermined value (S1808). If the PID of the next moving image file is equal to the predetermined value, the next moving image is a head file recorded by the recording of one time or a file in which the PID is changed to the predetermined value by the forward deletion processing. Therefore, if the PID of the next moving image file is equal to the predetermined value, the selected moving image file is set as an end of the moving images recorded by the recording of one time (S1811).

Subsequently, the control unit 102 discriminates whether or not the moving images to be displayed to the index screen remain (S1809). If there are remaining moving image files, the next moving image file is selected (S1812). If there are no remaining moving image files, an index screen is generated by using the thumbnail image data stored in the memory 105 and displayed to the display unit 109 (S1810). At this time, the control unit 102 displays information for discriminating that the moving images in a range from the head moving image set in S1805 to the end moving image set in S1811 are the moving images (group) recorded by the recording of one time onto the index screen.

After the index screen is displayed in this manner, the user selects a desired representative image from representative images displayed on the index screen and instructs the reproduction by operating the operation unit 103 (S1702). When the reproducing instruction is output, the control unit 102 instructs the recording reproducing unit 106 so as to reproduce the moving image file of the scene corresponding to the selected representative image. The recording reproducing unit 106 reproduces the designated moving image file from the recording medium 108 (S1703). The signal processing unit 104 decodes the reproduced moving image file, displays to the display unit 109, and outputs to the outside from the output unit 107.

The control unit 102 discriminates whether or not the moving image files are reproduced up to the end (S1704). If the moving image files are not reproduced up to the end, the control unit 102 discriminates whether or not a reproduction stop instruction is output (S1705). If there is no reproduction stop instruction, the reproduction of the moving image is continued as it is. If the reproduction stop instruction is output, the control unit 102 instructs the recording reproducing unit 106 so as to stop the reproduction of the moving image file. The recording reproducing unit 106 stops the reproduction of the moving image file (S1706). The control unit 102 again displays the index screen to the display unit 109.

If the moving images are reproduced up to the end in S1704, the control unit 102 confirms the NID of the moving image file being reproduced and discriminates whether or not the predetermined value "0" is stored in the NID (S1707). If "0" is stored in the NID, since the file is an end file recorded by the recording of one time, the control unit 102 instructs the recording reproducing unit 106 so as to stop the reproduction of the moving image file.

If the NID is not equal to "0", the control unit 102 discriminates whether or not the moving image file in which the same value as that of the NID of the moving image file being reproduced is recorded in the recording medium 108 (S1708). If the moving image file corresponding to the NID is not recorded, the control unit 102 instructs the recording reproducing unit 106 so as to stop the reproduction of the moving image file. If the moving image file corresponding to the NID is recorded, the control unit 102 discriminates whether or not the PID of the next moving image file corresponding to the NID is equal to the predetermined value "0" (S1709). When the PID of the next moving image file is equal to "0", the next moving image is a head file recorded by the recording of one time or a file in which the PID is changed to the predetermined value by the forward deletion processing. Therefore, the control unit 102 stops the reproduction of the moving image and displays the index screen (S1706). If the PID of the next moving image file is not equal to the predetermined value "0", the control unit 102 selects the next moving image and reproduces (S1710).

As mentioned above, in the present embodiment, if a plurality of moving image files were recorded during the recording of one time, the identification information of the file of immediately-before and the file of immediately-after is stored into the moving image file and recorded. Therefore, upon reproduction, the user can easily recognize that the files are the moving image files recorded by the recording of one time.

By deciding the moving image file to be reproduced subsequently on the basis of the identification information and continuously reproducing, the moving image files generated during the recording of one time can be continuously reproduced.

In the present embodiment, in the case where the deletion or the editing process such as partial deletion or the like of any one of the moving image files is executed, the identification information is changed in accordance with the contents of the editing process. Therefore, after the edition, since the moving images are not continuously reproduced in the portions before and after the deleted portion, such a situation that the moving images in which the continuity is lost by the editing process are continuously reproduced can be prevented.

As mentioned above, according to the invention, even if a plurality of files generated and recorded during the recording of one time are edited, the identification information for discriminating the association among them can be held and updated, and the continuous reproduction and the connecting process after the edition can be easily pergenerated.

Other Embodiments

The units constructing the recording apparatus and the processing steps of the recording method in the present embodiments of the invention mentioned above can be realized by a method whereby a program stored in a RAM, a ROM, or the like of a computer operates. Such a program and a computer-readable storage medium in which the program has been stored are incorporated in the invention.

The invention can be also embodied as, for example, a system, an apparatus, a method, a program, a storage medium, or the like. Specifically speaking, the invention may be applied to a system constructed by a plurality of apparatuses or to an apparatus constructed by one equipment.

The invention also incorporates a case where a program (in the embodiments, a program corresponding to the flowchart illustrated in FIG. 2) of software for realizing the functions of the embodiments mentioned above is supplied to the system or apparatus directly or from a remote place. The invention also incorporates a case where the computer of such a system or apparatus reads out the supplied program code and executes it.

Therefore, the program code itself which is installed into a computer in order to realize the functions and processings of the invention by the computer also realizes the invention. That is, the invention also incorporates a computer program itself for realizing the functions and processings of the invention. In this case, any form such as object code, program which is executed by an interpreter, script data which is supplied to the OS, or the like may be used so long as it has a function of the program.

As storage media for supplying the program, for example, there are a flexible disk, a hard disk, an optical disk, a magnetooptic disk, and the like. Further, there are also an MO, a CD-ROM, a CD-R, a CD-RW, a magnetic tape, a non-volatile memory card, a ROM, a DVD (DVD-ROM, DVD-R), and the like.

As another program supplying method, there is a method of connecting to Homepage of the Internet by using a browser of a client computer. The computer program itself of the invention can be supplied from Homepage or the program can be also supplied by a method whereby a compressed file including an automatic installing function is downloaded into a storage medium such as a hard disk or the like.

The program supplying method can be also realized by a method whereby the program code constructing the program of the invention is divided into a plurality of files and each file is downloaded from different Homepage. That is, a WWW server for allowing a plurality of users to download the program file for realizing the functions and processings of the invention by the computer is also incorporated in the invention.

As another method, the program of the invention is encrypted, stored into a storage medium such as a CD-ROM or the like, and distributed to the users who cleared predetermined conditions, and the users are allowed to download key information for decrypting the encryption from Homepage through the Internet. The program supplying method can be also realized by a method whereby the encrypted program is executed by using the key information and is installed into the computer.

The functions of the embodiments mentioned above are realized by a method whereby the computer executes the read-out program. Further, the functions of the embodiments mentioned above can be also realized by a method whereby the OS or the like which operates on the computer executes a part or all of actual processings on the basis of instructions of the program and the functions are realized by those processings.

Moreover, as another method, the functions of the embodiments mentioned above are realized by a method whereby, first, the program read out of the storage medium is written into a memory equipped for a function expanding board inserted in the computer or a function expanding unit connected to the computer, a CPU or the like provided for the function expanding board or the function expanding unit executes a part or all of actual processings on the basis of instructions of the program and the functions are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-186703 filed on Aug. 27, 2012 which is hereby incorporated by reference herein in its entirety.

What is claimed is:

1. An image processing apparatus for processing a plurality of moving image files each including moving image data and identification information relating to continuity between a moving image file and another moving image file, comprising:

a processing unit configured to perform an editing process for deleting a portion of the moving image data from a head of the moving image data included in a predetermined moving image file among the plurality of moving image files, and not for deleting another portion of the moving image data included in the predetermined moving image file; and a control unit configured to change the identification information of the predetermined moving image file in accordance with the editing process, wherein, in accordance with the processing unit performing the editing process for deleting the portion of the moving image data from the head of the moving image data included in the predetermined moving image file and not for deleting another portion of the moving image data included in the predetermined moving image file, the control unit changes the identification information of the predetermined moving image file such that it is discriminated that there is no moving image file which has continuity forwardly with the predetermined moving image file.

2. An apparatus according to claim 1, further comprising:

an output unit configured to output thumbnail images of the plurality of moving image files to a display apparatus so that the thumbnail images are displayed by the display apparatus; and a designating unit configured to designate a thumbnail image corresponding to the moving image file on which the editing process is to be performed from the plurality of thumbnail images displayed by the display apparatus, wherein the processing unit performs the editing process on the moving image file corresponding to the thumbnail image designated by the designating unit.

3. An apparatus according to claim 1, wherein the identification information of each of the plurality of moving image files includes first information for discriminating a moving image file which continues forwardly and second information for discriminating a moving image file which continues backwardly, and
wherein the control unit changes the first information included in the identification information of the predetermined moving image file such that it is discriminated that there is no moving image file which has continuity forwardly with the predetermined moving image file.

4. An apparatus according to claim 1, further comprising:
a recording unit that records the moving image file including moving image data and the identification information on a recording medium,
wherein the control unit sets first information of the identification information included in a first moving image file among a plurality of moving image files recorded from a recording start instruction to a recording stop instruction to a value indicating that there is no moving image file which continues forwardly, and sets second information of the identification information of a last moving image file among the plurality of moving image files recorded from the recording start instruction to the recording stop instruction to a value indicating that there is no moving image file which continues backwardly.

5. An image processing method of processing a plurality of moving image files each including moving image data and identification information relating to continuity between a moving image file and another moving image file, comprising:
performing an editing process for deleting a portion of the moving image data from a head of the moving image data included in a predetermined moving image file among the plurality of moving image files, and not for deleting another portion of the moving image data included in the predetermined moving image file; and
changing the identification information of the predetermined moving image file in accordance with the editing process,
wherein, in accordance with the editing process for deleting the portion of the moving image data from the head of the moving image data included in the predetermined moving image file and not for deleting another portion of the moving image data included in the predetermined moving image file, identification information of the predetermined moving image file is changed such that it is discriminated that there is no moving image file which has continuity forwardly with the predetermined moving image file.

6. An image processing apparatus for processing a plurality of moving image files each including moving image data and identification information relating to continuity between a moving image file and another moving image file, comprising:
a processing unit configured to perform an editing process for deleting a portion of the moving image data from an end of the moving image data included in a predetermined moving image file among the plurality of moving image files, and not for deleting another portion of the moving image data included in the predetermined moving image file; and
a control unit configured to change the identification information of the predetermined moving image file in accordance with the editing process,
wherein, in accordance with the processing unit performing the editing process for deleting the portion of the moving image data from the end of the moving image data included in the predetermined moving image file and not for deleting another portion of the moving image data included in the predetermined moving image file, the control unit changes the identification information of the predetermined moving image file such that it is discriminated that there is no moving image file which has continuity backwardly with the predetermined moving image file.

7. An apparatus according to claim 6, wherein the identification information of each of the plurality of moving image files includes first information for discriminating a moving image file which continues forwardly and second information for discriminating a moving image file which continues backwardly, and
wherein the control unit changes the second information included in the identification information of the predetermined moving image file such that it is discriminated that there is no moving image file which has continuity backwardly with the predetermined moving image file.

8. An apparatus according to claim 6, further comprising:
a recording unit that records the moving image file including moving image data and the identification information on a recording medium,
wherein the control unit sets first information of the identification information included in a first moving image file among a plurality of moving image files recorded from a recording start instruction to a recording stop instruction to a value indicating that there is no moving image file which continues forwardly, and sets second information of the identification information of a last moving image file among the plurality of moving image files recorded from the recording start instruction to the recording stop instruction to a value indicating that there is no moving image file which continues backwardly.

9. An image processing apparatus for processing a plurality of moving image files each including moving image data and identification information relating to continuity between a moving image file and another moving image file, comprising:
a processing unit configured to perform an editing process for deleting a portion of the moving image data from a head of the moving image data included in a predetermined moving image file among the plurality of moving image files and not for deleting another portion of the moving image data included in the predetermined moving image file; and
a control unit configured to change the identification information of a moving image file immediately before the predetermined moving image file in accordance with the editing process,
wherein, in accordance with the processing unit performing the editing process for deleting the portion of the moving image data from the head of the moving image data included in the predetermined moving image file and not for deleting another portion of the moving image data included in the predetermined moving image file, the control unit changes the identification information of the moving image file immediately before the predetermined moving image file such that it is discriminated that there is no moving image file which has continuity backwardly with the moving image file immediately before the predetermined moving image file.

10. An apparatus according to claim 9, wherein the identification information of each of the plurality of moving image files includes first information for discriminating a moving image file which continues forwardly and second information for discriminating a moving image file which continues backwardly, and wherein the control unit changes the first information included in the identification information of the moving image file immediately before the predetermined moving image file such that it is discriminated that there is no moving image file which has continuity backwardly with the moving image file immediately before the predetermined moving image file.

11. An apparatus according to claim 9, wherein, in accordance with the processing unit performing the editing process for deleting the portion of the moving image data from the head of the moving image data included in the predetermined moving image file and not for deleting another portion of the moving image data included in the predetermined moving image file, the control unit further changes identification information of the predetermined moving image file such that it is discriminated that there is no moving image file which continues forwardly with the predetermined moving image file.

12. An apparatus according to claim 9, further comprising:
a recording unit that records the moving image file including moving image data and the identification information on a recording medium,
wherein the control unit sets first information of the identification information included in a first moving image file among a plurality of moving image files recorded from a recording start instruction to a recording stop instruction to a value indicating that there is no moving image file which continues forwardly, and sets second information of the identification information of a last moving image file among the plurality of moving image files recorded from the recording start instruction to the recording stop instruction to a value indicating that there is no moving image file which continues backwardly.

13. An image processing apparatus for processing a plurality of moving image files each including moving image data and identification information relating to continuity between a moving image file and another moving image file, comprising:
a processing unit configured to perform an editing process for deleting a portion of the moving image data from an end of the moving image data included in a predetermined moving image file among the plurality of moving image files and not for deleting another portion of the moving image data included in the predetermined moving image file; and
a control unit configured to change the identification information of a moving image file subsequent to the predetermined moving image file in accordance with the editing process,
wherein, in accordance with the processing unit performing the editing process for deleting the portion of the moving image data from the end of the moving image data included in the predetermined moving image file and not for deleting another portion of the moving image data included in the predetermined moving image file, the control unit changes the identification information of the moving image file subsequent to the predetermined moving image file such that it is discriminated that there is no moving image file which has continuity forwardly with the moving image file subsequent to the predetermined moving image file.

14. An apparatus according to claim 13, wherein the identification information of each of the plurality of moving image files includes first information for discriminating a moving image file which continues forwardly and second information for discriminating a moving image file which continues backwardly, and wherein the control unit changes the first information included in the identification information of the moving image file subsequent to the predetermined moving image file such that it is discriminated that there is no moving image file which has continuity forwardly with the moving image file subsequent to the predetermined moving image file.

15. An apparatus according to claim 13, wherein, in accordance with the processing unit performing the editing process for deleting the portion of the moving image data from the end of the moving image data included in the predetermined moving image file and not for deleting another portion of the moving image data included in the predetermined moving image file, the control unit further changes identification information of the predetermined moving image file such that it is discriminated that there is no moving image file which has continuity backwardly with the predetermined moving image file.

16. An apparatus according to claim 13, further comprising:
a recording unit that records the moving image file including moving image data and the identification information on a recording medium,
wherein the control unit sets first information of the identification information included in a first moving image file among a plurality of moving image files recorded from a recording start instruction to a recording stop instruction to a value indicating that there is no moving image file which continues forwardly, and sets second information of the identification information of a last moving image file among the plurality of moving image files recorded from the recording start instruction to the recording stop instruction to a value indicating that there is no moving image file which continues backwardly.

17. An image processing method for processing a plurality of moving image files each including moving image data and identification information relating to continuity between a moving image file and another moving image file, comprising:
performing an editing process for deleting a portion of the moving image data from an end of the moving image data included in a predetermined moving image file among the plurality of moving image files and not for deleting another portion of the moving image data included in the predetermined moving image file; and
changing the identification information of the predetermined moving image file in accordance with the editing process,
wherein, in accordance with the editing process for deleting the portion of the moving image data from the end of the moving image data included in the predetermined moving image file and not for deleting another portion of the moving image data included in the predetermined moving image file, the changing changes the identification information of the predetermined moving image file such that it is discriminated that there is no moving image file which has continuity backwardly with the predetermined moving image file.

18. An image processing method for processing a plurality of moving image files each including moving image data and identification information relating to continuity between a moving image file and another moving image file, comprising:

performing an editing process for deleting a portion of the moving image data from a head of the moving image data included in a predetermined moving image file among the plurality of moving image files and not for deleting another portion of the moving image data included in the predetermined moving image file; and changing the identification information of a moving image file immediately before the predetermined moving image file in accordance with the editing process, wherein, in accordance with performing the editing process for deleting the portion of the moving image data from the head of the moving image data included in the predetermined moving image file and not for deleting another portion of the moving image data included in the predetermined moving image file, the changing changes the identification information of the moving image file immediately before the predetermined moving image file such that it is discriminated that there is no moving image file which has continuity backwardly with the moving image file immediately before the predetermined moving image file.

19. An image processing method for processing a plurality of moving image files each including moving image data and identification information relating to continuity between a moving image file and another moving image file, comprising:

performing an editing process for deleting a portion of the moving image data from an end of the moving image data included in a predetermined moving image file among the plurality of moving image files and not for deleting another portion of the moving image data included in the predetermined moving image file; and changing the identification information of a moving image file subsequent to the predetermined moving image file in accordance with the editing process, wherein, in accordance with performing the editing process for deleting the portion of the moving image data from the end of the moving image data included in the predetermined moving image file and not for deleting another portion of the moving image data included in the predetermined moving image file, the changing changes the identification information of the moving image file subsequent to the predetermined moving image file such that it is discriminated that there is no moving image file which has continuity forwardly with the moving image file subsequent to the predetermined moving image file.

* * * * *